(12) United States Patent
Si et al.

(10) Patent No.: US 11,497,008 B2
(45) Date of Patent: Nov. 8, 2022

(54) ENHANCEMENTS ON SYNCHRONIZATION, RANDOM ACCESS, AND HARQ OPERATION FOR NON-TERRESTRIAL NETWORKS

(71) Applicant: Samsung Electronics Co., Ltd., Suwon-si (KR)

(72) Inventors: Hongbo Si, Plano, TX (US); Aris Papasakellariou, Houston, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 77 days.

(21) Appl. No.: 16/946,923

(22) Filed: Jul. 10, 2020

(65) Prior Publication Data
US 2021/0029679 A1  Jan. 28, 2021

Related U.S. Application Data

(60) Provisional application No. 62/878,489, filed on Jul. 25, 2019, provisional application No. 62/883,238, filed on Aug. 6, 2019, provisional application No. 62/934,180, filed on Nov. 12, 2019.

(51) Int. Cl.
*H04W 72/04*  (2009.01)
*H04L 1/18*  (2006.01)

(52) U.S. Cl.
CPC ......... *H04W 72/042* (2013.01); *H04L 1/1812* (2013.01); *H04W 72/0413* (2013.01)

(58) Field of Classification Search
CPC ............ H04W 72/042; H04W 72/0413; H04L 1/1812; H04L 1/1685; H04L 1/1825; H04L 1/1896; H04L 1/1854
See application file for complete search history.

(56) References Cited

U.S. PATENT DOCUMENTS

| | | | |
|---|---|---|---|
| 2010/0325506 A1* | 12/2010 | Cai | ...................... H04W 72/042 714/E11.131 |
| 2015/0326354 A1 | 11/2015 | Li et al. | |
| 2018/0159667 A1 | 6/2018 | Li et al. | |
| 2018/0167171 A1 | 6/2018 | Wu et al. | |

OTHER PUBLICATIONS

MediaTek Inc., "Delay-tolerant re-transmission mechanisms in NR-NTN", 3GPP TSG RAN WG1 Meeting #97, May 13-17, 2019, R1-1906466, 7 pages.

(Continued)

*Primary Examiner* — Dady Chery

(57) ABSTRACT

A user equipment (UE), a base station, and a method for managing hybrid automatic repeat request (HARQ) feedback for downlink synchronization. The UE includes at least one transceiver configured to receive downlink control information (DCI) in a physical downlink control channel (PDCCH), and at least one processor operably connected to the at least one transceiver. The at least one processor is configured to determine, based on a first field in the DCI, whether a hybrid automatic repeat request (HARQ) feedback is disabled, and determine, if the HARQ feedback is disabled, a second field in the DCI to be one of a reserved field or a zero bitwidth field based on a format of the DCI.

20 Claims, 18 Drawing Sheets

(56) References Cited

OTHER PUBLICATIONS

Qualcomm Incorporated, "Delay-Tolerant Retransmission Mechanisms for NTN", 3GPP TSG RAN WG1 #96bis, Apr. 8-12, 2019, R1-1905017, 2 pages.

Nomor Research GmbH, Thales, "Considerations on MAC Control Loops and Timings in Non-Terrestrial Networks (NTN)", 3GPP TSG-RAN WG2 Meeting #103-Bis, Oct. 8-12, 2018, R2-1813615, 6 pages.

International Search Report dated Oct. 26, 2020 in connection with International Patent Application No. PCT/KR2020/009814, 3 pages.

"3rd Generation Partnership Project; Technical Specification Group Radio Access Network; NR; Physical channels and modulation (Release 15)", 3GPP TS 38.211 V15.5.0, Mar. 2019, 96 pages.

"3rd Generation Partnership Project; Technical Specification Group Radio Access Network; NR; Physical channels and modulation (Release 15)", 3GPP TS 38.211 V15.6.0, Jun. 2019, 97 pages.

"3rd Generation Partnership Project; Technical Specification Group Radio Access Network; NR; Multiplexing and channel coding( Release 15)", 3GPP TS 38.212 V15.5.0, Mar. 2019, 101 pages.

"3rd Generation Partnership Project; Technical Specification Group Radio Access Network; NR; Multiplexing and channel coding (Release 15)", 3GPP TS 38.212 V15.6.0, Jun. 2019, 101 pages.

"3rd Generation Partnership Project; Technical Specification Group Radio Access Network; NR; Physical layer procedures for control (Release 15)", 3GPP TS 38.213 V15.5.0, Mar. 2019, 104 pages.

"3rd Generation Partnership Project; Technical Specification Group Radio Access Network; NR; Physical layer procedures for control (Release 15)", 3GPP TS 38.213 V15.6.0, Jun. 2019, 107 pages.

"3rd Generation Partnership Project; Technical Specification Group Radio Access Network; NR; Physical layer procedures for data (Release 15)", 3GPP TS 38.214 V15.5.0, Mar. 2019, 103 pages.

"3rd Generation Partnership Project; Technical Specification Group Radio Access Network; NR; Physical layer procedures for data (Release 15)", 3GPP TS 38.214 V15.6.0, Jun. 2019, 105 pages.

"3rd Generation Partnership Project; Technical Specification Group Radio Access Network; NR; Radio Resource Control (RRC) protocol specification, (Release 15)", 3GPP TS 38.331 V15.5.0, Mar. 2019, 491 pages.

"5G; NR; Radio Resource Control (RRC); Protocol specification (3GPP TS 38.331 version 15.6.0 Release 15)", ETSI TS 138 331 V15.6.0, Jul. 2019, 516 pages.

Extended European Search Report dated Jul. 1, 2022 regarding Application No. 20844468.7, 9 pages.

MediaTek Inc., "Summary for more delay-tolerant re-transmission mechanisms in NR-NTN", 3GPP TSG RAN WG1 Meeting #97, R1-1907656, May 2019, 8 pages.

\* cited by examiner

ENHANCEMENTS ON SYNCHRONIZATION, RANDOM ACCESS, AND HARQ OPERATION FOR NON-TERRESTRIAL NETWORKS

CROSS-REFERENCE TO RELATED APPLICATION AND CLAIM OF PRIORITY

This application claims priority under 35 U.S.C. § 119(e) to U.S. Provisional Patent Application No. 62/878,489 filed on Jul. 25, 2019, to U.S. Provisional Patent Application No. 62/883,238 filed on Aug. 6, 2019, and to U.S. Provisional Patent Application No. 62/934,180 filed on Nov. 12, 2019. The above-identified provisional patent applications are hereby incorporated by reference in its entirety.

TECHNICAL FIELD

The present disclosure relates to a pre-5$^{th}$-Generation (5G) or 5G communication system to be provided for supporting higher data rates Beyond 4$^{th}$-Generation (4G) communication system such as Long-Term Evolution (LTE). More particularly, embodiments of the present disclosure are directed to non-terrestrial networks. Even more particularly, embodiments of the present disclosure are directed downlink synchronization, management of HARQ transmissions, and enhanced PRACH preamble formats.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large-scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

SUMMARY

Embodiments of the present disclosure include a user equipment (UE), a base station (BS), and a method for managing hybrid automatic repeat request transmissions in a wireless communication system. One embodiment is directed to a UE that includes at least one transceiver configured to receive downlink control information (DCI) in a physical downlink control channel (PDCCH), and at least one processor operably connected to the at least one transceiver. The at least one processor is configured to determine, based on a first field in the DCI, whether a hybrid automatic repeat request (HARQ) feedback is disabled, and determine, if the HARQ feedback is disabled, a second field in the DCI to be one of a reserved field or a zero bitwidth field based on a format of the DCI.

Another embodiment is directed to a BS that includes a transceiver configured to transmit downlink control information (DCI) in a physical downlink control channel (PDCCH). The BS also includes a processor operably connected to the transceiver, the processor being configured to determine whether hybrid automatic repeat request (HARQ) feedback is disabled. The processor is also configured to generate the DCI with a first field indicating whether the HARQ feedback is disabled. The DCI includes a second field that can be determined to be one of a reserved field or a zero bitwidth field based on a format of the DCI if the first field indicates that the HARQ feedback is disabled.

Yet another embodiment is directed to a method that includes the steps of receiving downlink control information (DCI) in a physical downlink control channel (PDCCH); determining, based on a first field in the DCI, whether a hybrid automatic repeat request (HARQ) feedback is disabled; and determining, if the HARQ feedback is disabled, a second field in the DCI to be one of a reserved field or a zero bitwidth field based on a format of the DCI.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

The following documents are hereby incorporated by reference into the present disclosure as if fully set forth herein: 3GPP TS 38.211 v15.5.0 and v15.6.0, "NR; Physical channels and modulation", hereinafter "REF 1"; 3GPP TS 38.212 v15.5.0 and v15.6.0, "NR; Multiplexing and channel coding", hereinafter "REF 2"; 3GPP TS 38.213 v15.5.0 and v15.6.0, "NR; Physical layer procedures for control", hereinafter "REF 3"; 3GPP TS 38.214 v15.5.0 and v15.6.0, "NR; Physical layer procedures for data", hereinafter "REF 4"; 3GPP TS 38.331 v15.5.0 and v15.6.0, "NR; Radio Resource Control (RRC) protocol specification", hereinafter "REF 5".

New radio (NR) supports synchronization through synchronization signals transmitted on downlink. Compared to Long-Term Evolution (LTE), NR supports larger range of carrier frequencies and more flexibly numerology. This concept is described in more detail in the discussion of FIGS. 7-9 that follow. Novel aspects of this disclosure recognize that, for non-terrestrial networks (NTNs), there is typically a long delay spread between transmitter and receiver (e.g. from tens to hundreds of ms regarding different development scenarios), and significant Doppler shift due to the high mobility of satellite in some of the development scenarios. These aspects impact the downlink synchronization performance. This disclosure proposes enhancements to address the downlink synchronization issues in NTN.

Figure 12:
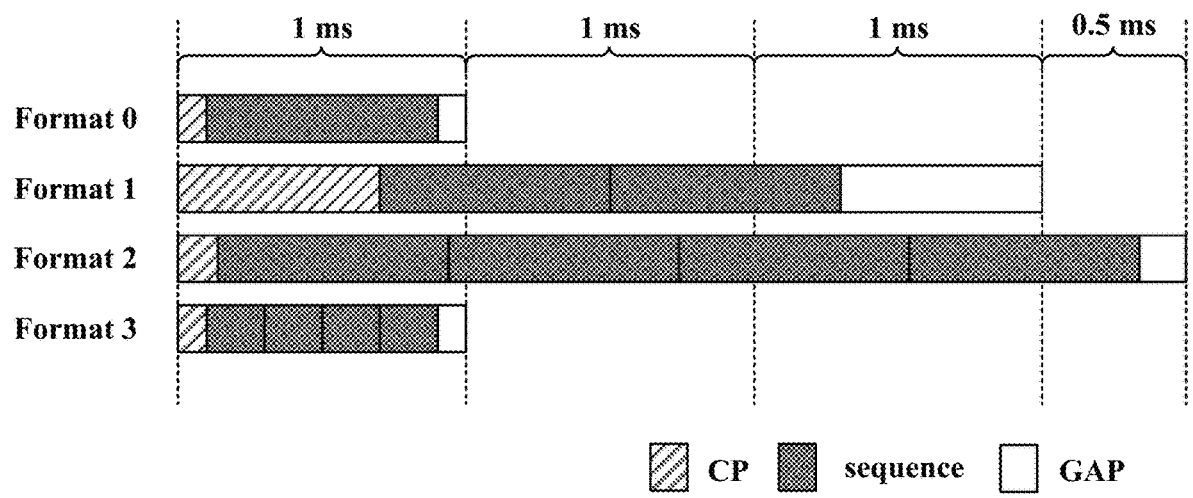
FIG. 12 illustrates PRACH formats with a long sequence according to various embodiments of this disclosure.
Figure 13:
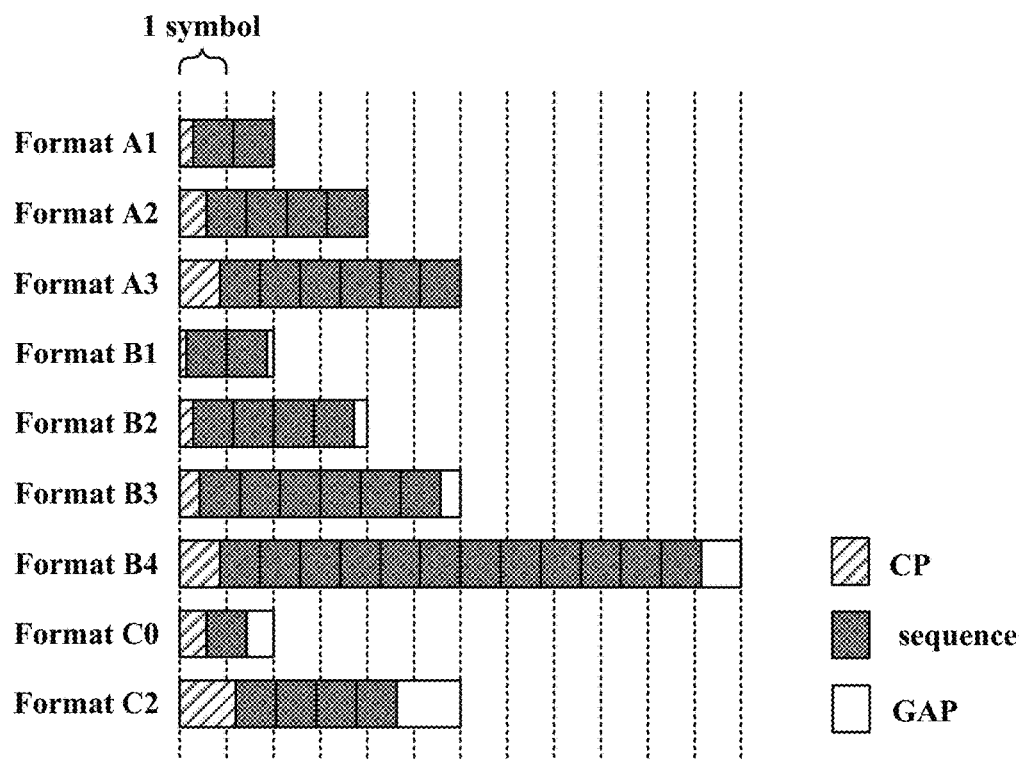
FIG. 13 illustrates PRACH formats with a short sequence according to various embodiments of this disclosure.

NR Rel-15 also supports multiple physical random access channel (PRACH) preamble formats. Formats 0, 1, 2, and 3 are for long preamble sequence lengths of 839 and with sub-carrier spacing (SCS) as either 1.25 kHz or 5 kHz. Formats A1, A2, A3, B1, B2, B3, B4, C0, and C2 are for short preamble sequence length of 139 and with SCS as 15 kHz, 30 kHz, 60 kHz, and 120 kHz. An illustration of PRACH preamble formats with long sequences is shown in FIG. 12, and an illustration of PRACH preamble formats with short sequences is shown in FIG. 13.

Figure 1A:
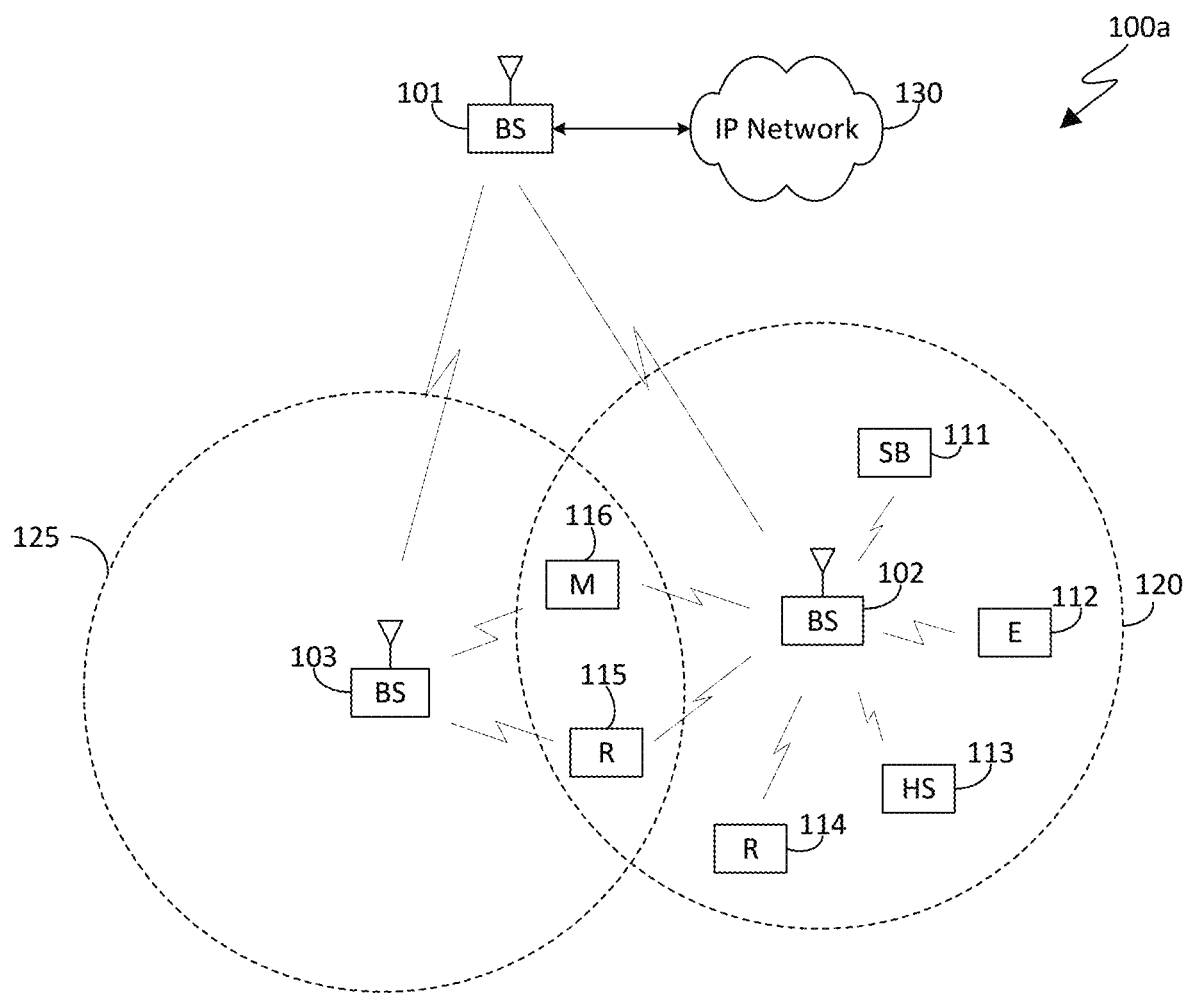
FIGS. 1A and 1B illustrate exemplary wireless communication networks according to various embodiments of this disclosure.
Figure 1B:
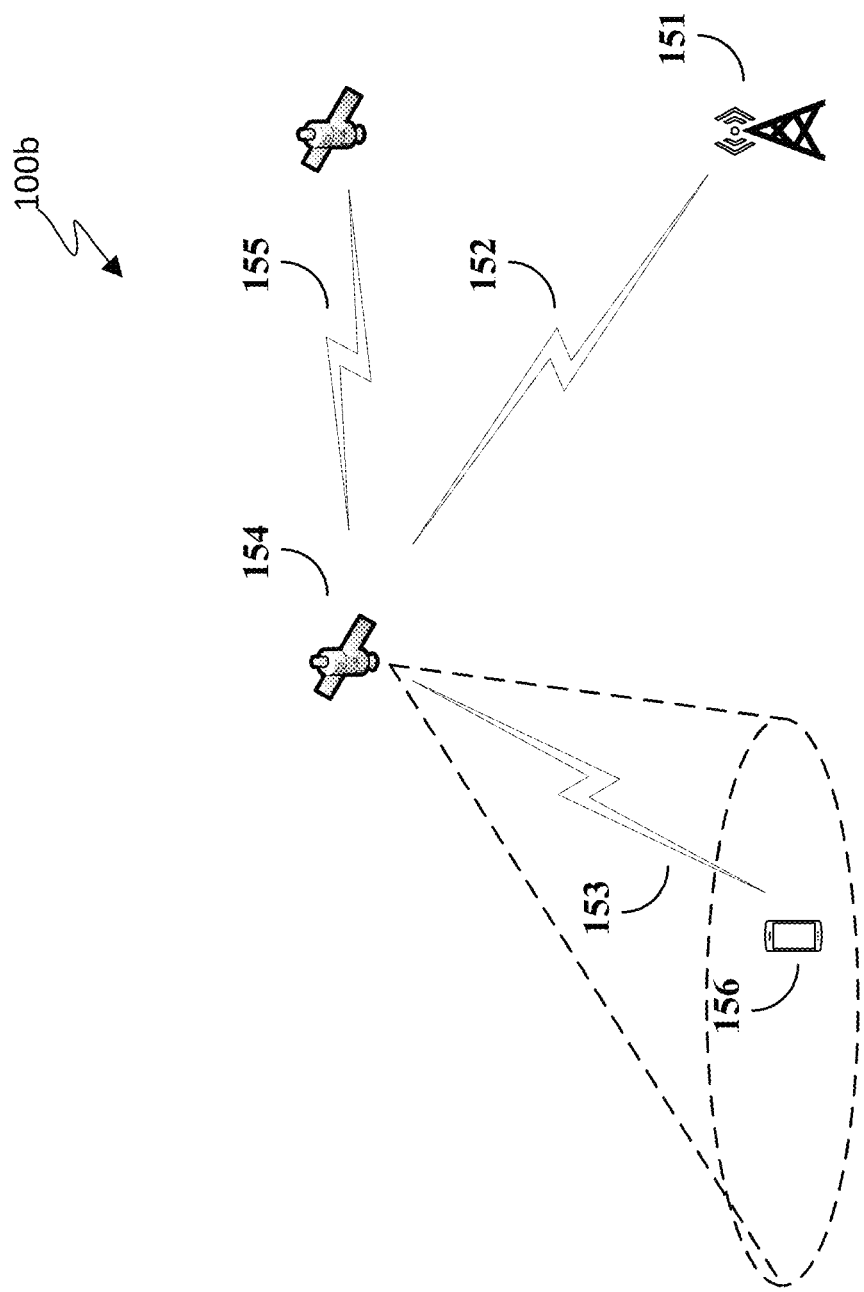

For a new type of use case of NR beyond Rel-15, an NTN considers a network or a segment of networks using RF resources on board a satellite or UAS platform, as shown in FIG. 1B. For NTN, the size of a footprint for a transmission beam generated by the satellite is much larger than the terrestrial cell in NR Rel-15, such that the coverage of PRACH preamble supported in Rel-15 may not be sufficient. Hence, novel aspects of this disclosure recognize the need for enhancement to the PRACH preamble format in order to support large cell size. As will be discussed in more detail herein, the enhancement could be on the sequence length used for PRACH preamble, the SCS supported for PRACH preamble, and the PRACH preamble composition. Two sets of PRACH preamble formats are described in the disclosure. The first set of PRACH preamble formats is based on a SCS scaled from 1.25 kHz and the second set of PRACH preamble formats is based on a SCS scaled from 15 kHz.

NR also supports hybrid automatic repeat request (HARQ) in both downlink and uplink. More precisely, asynchronous HARQ is supported for both downlink and uplink, where multiple HARQ processes are operated in any order. To keep track of each HARQ process, the transmitter and receiver in the HARQ process should both know the exact HARQ process number for accurately reception of transmission or retransmission. Meanwhile, unlike LTE, the timing between data transmission and HARQ response is flexible in NR. The radio resource control (RRC) message configures a table of possible timing offset between data transmission and HARQ response, and downlink control information (DCI) further indicates which value in the configured table is utilized between the scheduled data transmission and the corresponding HARQ response.

For NTN, there is typically a large propagation delay between transmitter and receiver, and the particular maximum round trip delay (RTD) depends on the implementation scenarios. TABLE 7 shows example max RTD for some typical NTN scenarios. As can be seen, for geosynchronous equatorial orbit (GEO) satellite, the max RTD could be exceeding 500 ms, and for low-earth orbit (LEO) satellite, the max RTD could be as large as 40 ms for the extreme case, which are both much larger than the ones considered in terrestrial network.

The large propagation delay in NTN challenges the effectiveness of HARQ, and also challenge the implementation of HARQ with significant increase of the buffer size at both transmitter and receiver. Hence, novel aspects of this disclosure also recognize that at least for some of the NTN scenarios, there is a need for disabling HARQ, and this disclosure includes the details of methods to disable HARQ, and the corresponding impact when HARQ is disabled.

FIG. 1A illustrates an exemplary wireless communication network 100a according to various embodiments of this disclosure. The embodiment of the wireless network 100a shown in FIG. 1A is for illustration only. Other embodiments of the wireless network 100a could be used without departing from the scope of this disclosure.

As shown in FIG. 1A, the wireless network 100a includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WIFI hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116.

Depending on the network type, the term 'base station' can refer to any component (or collection of components) configured to provide wireless access to a network, such as transmit point (TP), transmit-receive point (TRP), a gNB, a macrocell, a femtocell, a WIFI access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, wireless network 100a can be a 5G communication system in which a UE, such as UE 116, can communicate with a BS, such as BS 102, and/or network components for facilitating downlink synchronization, management of HARQ transmissions, and/or implementation of enhanced PRACH preamble formats in non-terrestrial networks.

Although FIG. 1A illustrates one example of a wireless network 100a, various changes may be made to FIG. 1A. For example, the wireless network 100a could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

FIG. 1B illustrates another exemplary wireless communication network according to various embodiments of this disclosure. Non-terrestrial network 100b can be a standalone network or a segment of a network using RF resources on board a satellite or unmanned aerial system (UAS) platform.

NTN 100b illustrates a typical scenario of an NTN providing access to user equipment 156. NTN 100b typically includes one or more sat-gateways 151 that connect the NTN 100b to a public data network. NTN 100b also includes a GEO satellite 154 fed by the one or more sat-gateways 151 deployed across the satellite targeted coverage (e.g. regional or even continental coverage). An assumption can be made that a UE, such as UE 156, in a cell is served by only one sat-gateway. A non-GEO satellite can be served successively by one or several sat-gateways at a time and the system ensures service and feeder link continuity between the successive serving sat-gateways with sufficient time duration to proceed with mobility anchoring and hand-over.

NTN 100b can also include a UAS platform. A satellite 154 or UAS platform may implement either a transparent or a regenerative (with on board processing) payload. A transparent payload includes radio frequency filtering, frequency conversion and amplification so that the waveform signal repeated by the payload is un-changed. A regenerative payload includes radio frequency filtering, frequency conversion and amplification as well as demodulation/decoding, switch and/or routing, coding/modulation, which is effectively equivalent to having all or part of base station functions (e.g. gNB) on board the satellite 154 or UAS platform.

Figure 10:
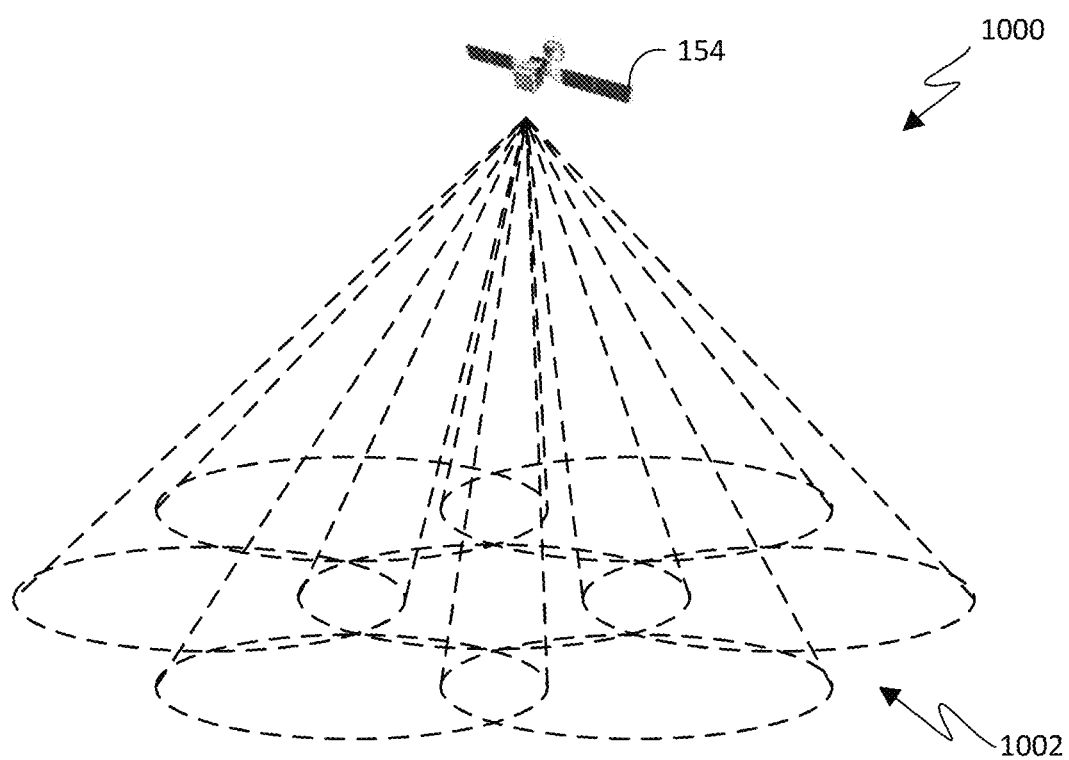
FIG. 10 illustrates beam footprints generated by a satellite according to various embodiments of this disclosure.

The satellite 154 or UAS platform typically generates several beams over a given service area bounded by its field of view, as depicted in FIG. 10. The footprints of the beams are typically of elliptic shape. The field of view of a satellite 154 or UAS platform depends on the onboard antenna diagram and minimum elevation angle.

The satellite 154 can be connected to the one or more sat-gateways 151 by a feeder link or radio link 152. The satellite 154 can have a service link or radio link 153 with the UE 156. The satellite 154 can also have an optional inter-satellite link (ISL) 155 to implement a constellation of satellites. This will require regenerative payloads on board the satellites. ISL 155 may operate in RF frequency or optical bands.

As described in more detail below, NTN 100b can be used for facilitating downlink synchronization, management of HARQ transmissions, and/or implementation of enhanced PRACH preamble formats.

Figure 2:
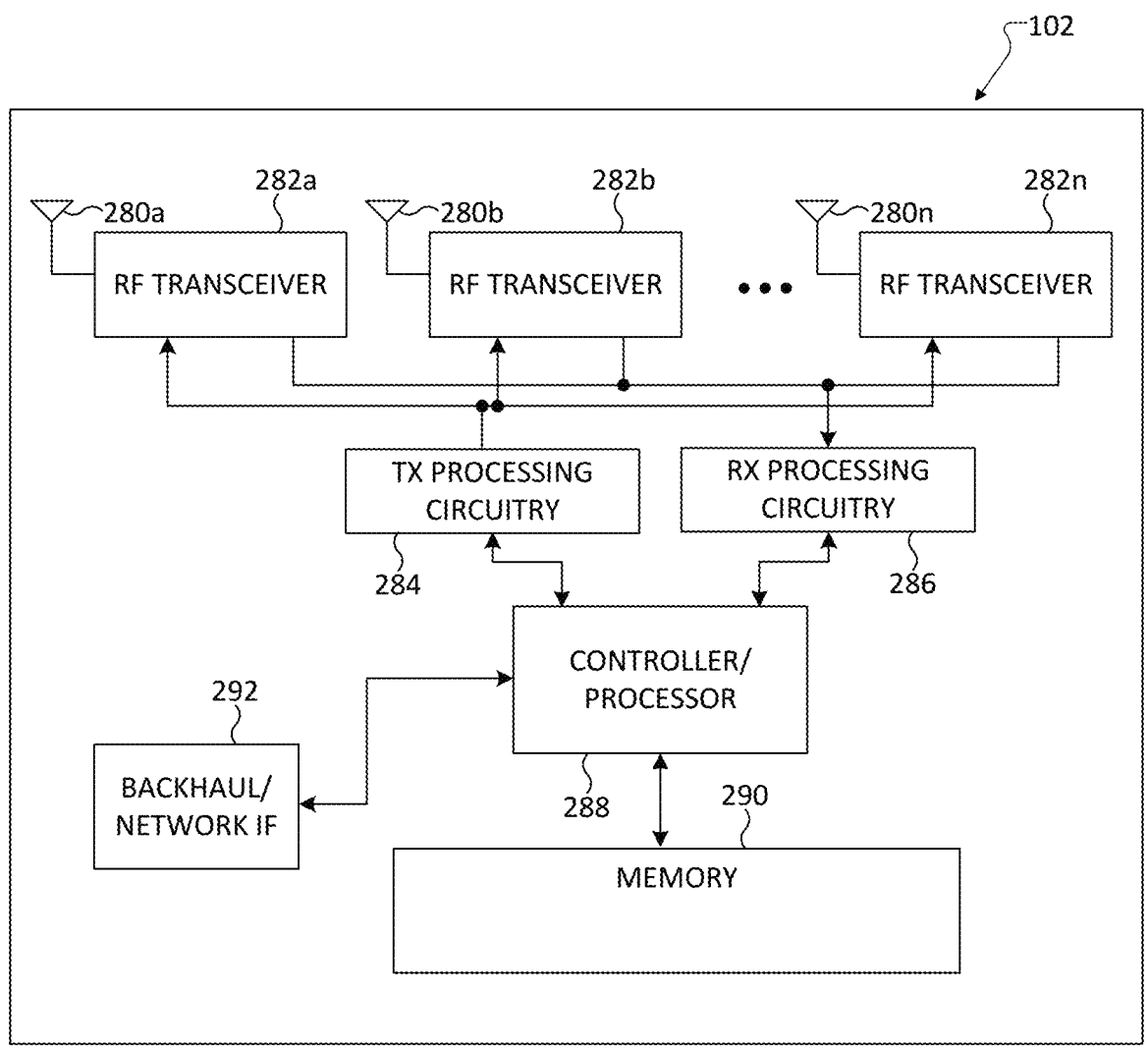
FIG. 2 illustrates an exemplary base station (BS) in the wireless communication network according to various embodiments of this disclosure.

FIG. 2 illustrates an exemplary base station (BS) according to various embodiments of this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB. Additionally, the BS can take the form of a satellite or UAS platform as described in FIG. 1B.

As shown in FIG. 2, the gNB 102 includes multiple antennas 280a-280n, multiple RF transceivers 282a-282n, transmit (TX) processing circuitry 284, and receive (RX) processing circuitry 286. The gNB 102 also includes a controller/processor 288, a memory 290, and a backhaul or network interface 292.

The RF transceivers 282a-282n receive, from the antennas 280a-280n, incoming RF signals, such as signals transmitted by UEs in the network 100a. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the gNB 102. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the gNB 102 by the controller/processor 288. In some embodiments, the controller/processor 288 includes at least one microprocessor or microcontroller.

The controller/processor 288 is also capable of executing programs and other processes resident in the memory 290, such as a basic OS. The controller/processor 288 can move data into or out of the memory 290 as required by an executing process.

The controller/processor 288 is also coupled to the backhaul or network interface 292. The backhaul or network interface 292 allows the gNB 102 to communicate with other devices or systems over a backhaul connection or over a network. The interface 292 could support communications over any suitable wired or wireless connection(s). For example, when the gNB 102 is implemented as part of a cellular communication system (such as one supporting 5G, LTE, or LTE-A), the interface 292 could allow the gNB 102 to communicate with other gNBs over a wired or wireless backhaul connection. When the gNB 102 is implemented as an access point, the interface 292 could allow the gNB 102 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, the BS 102 can communicate information to a UE, such as UE 116 in FIG. 1 over a network, for facilitating downlink synchronization, management of HARQ transmissions, and/or implementation of enhanced PRACH preamble formats.

Although FIG. 2 illustrates one example of gNB 102, various changes may be made to FIG. 2. For example, the gNB 102 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the gNB 102 could include multiple instances of each (such as one per RF transceiver). Also, various components in FIG. 2 could be combined, further subdivided, or omitted and additional components could be added according to particular needs.

Figure 3:
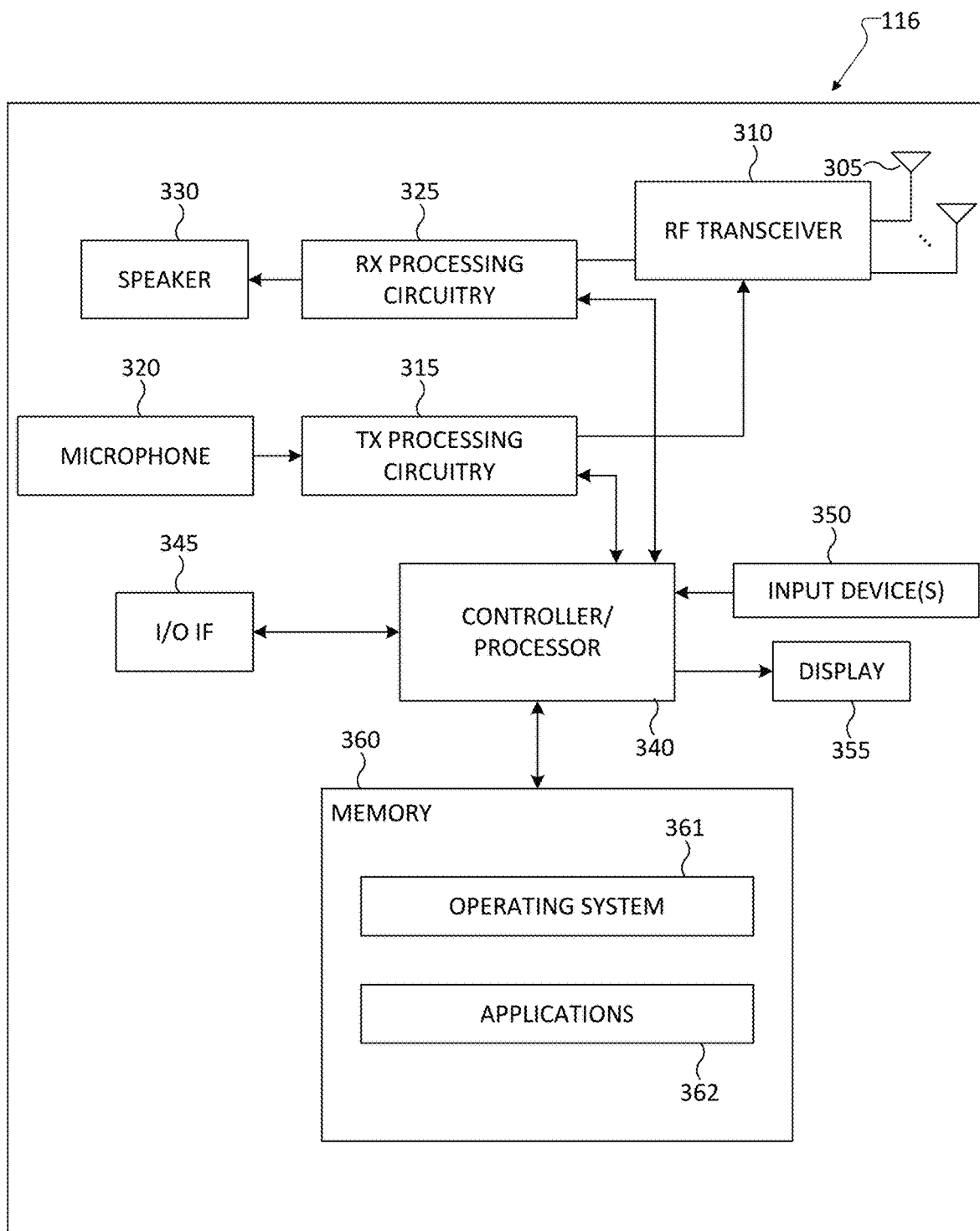
FIG. 3 illustrates an exemplary user equipment (UE) in the wireless communication network according to various embodiments of this disclosure.

FIG. 3 illustrates an exemplary user equipment (UE) according to various embodiments of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an gNB of the network 100a. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from gNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random-access memory (RAM), and another part of the memory 360 could include a Flash memory or other read-only memory (ROM).

As described in more detail below, UE 116 can communicate with a BS, such as BS 102 in FIG. 2 over a network, for facilitating downlink synchronization, management of HARQ transmissions, and/or implementation of enhanced PRACH preamble formats.

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
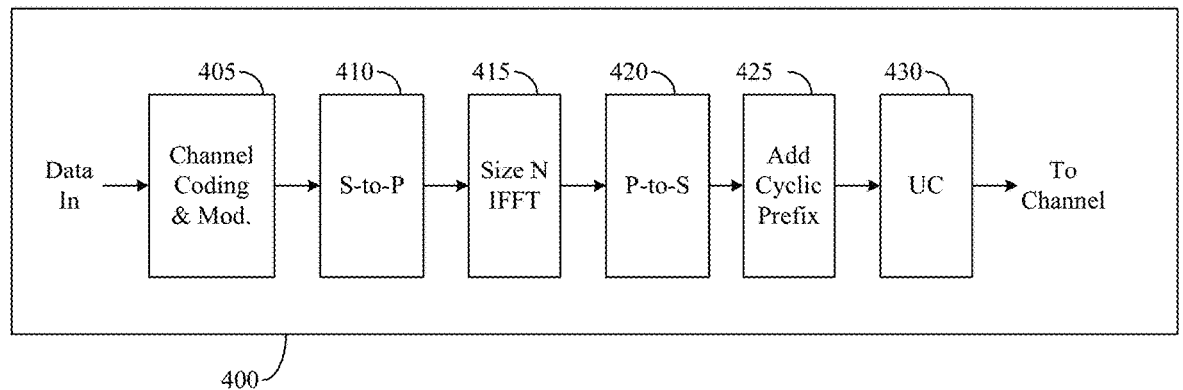
FIGS. 4A and 4B illustrate exemplary transmit and receive paths according to various embodiments of this disclosure.
Figure 4B:
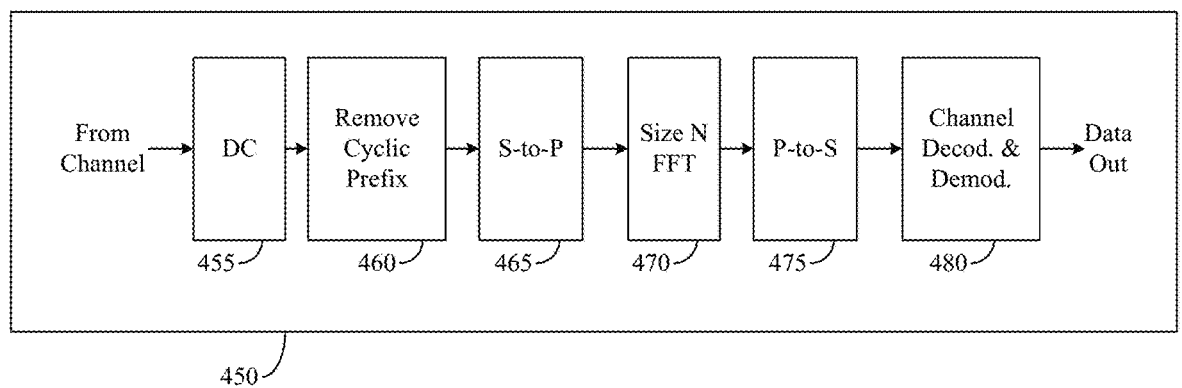

FIGS. 4A and 4B illustrate exemplary wireless transmit and receive paths according to various embodiments of this disclosure. In FIGS. 4A and 4B, for downlink communication, the transmit path circuitry can be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. The receive path 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in transmit path 400 and receive path 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In the following example, the transmit path 400 is implemented in a BS and the receive path is implemented in a UE. In transmit path 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal can arrive at a UE after passing through the wireless channel, and reverse operations to those at a gNB are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path 400 that is analogous to transmitting in the downlink to user equipment 111-116 and may implement a receive path 450 that is analogous to receiving in the uplink from user equipment 111-116. Similarly, each one of user equipment 111-116 may implement a transmit path 400 corresponding to the architecture for transmitting in the uplink to gNBs 101-103 and may implement a receive path 450 corresponding to the architecture for receiving in the downlink from gNBs 101-103.

As described in more detail below the transmit path 400 and receive path 450 can be implemented in UEs, such as UE 116 in FIG. 3, and BSs, such as BS 102 in FIG. 2, for facilitating downlink synchronization, management of HARQ transmissions, and/or implementation of enhanced PRACH preamble formats.

Although FIGS. 4A and 4B illustrate examples of wireless transmit and receive paths, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Figure 5:
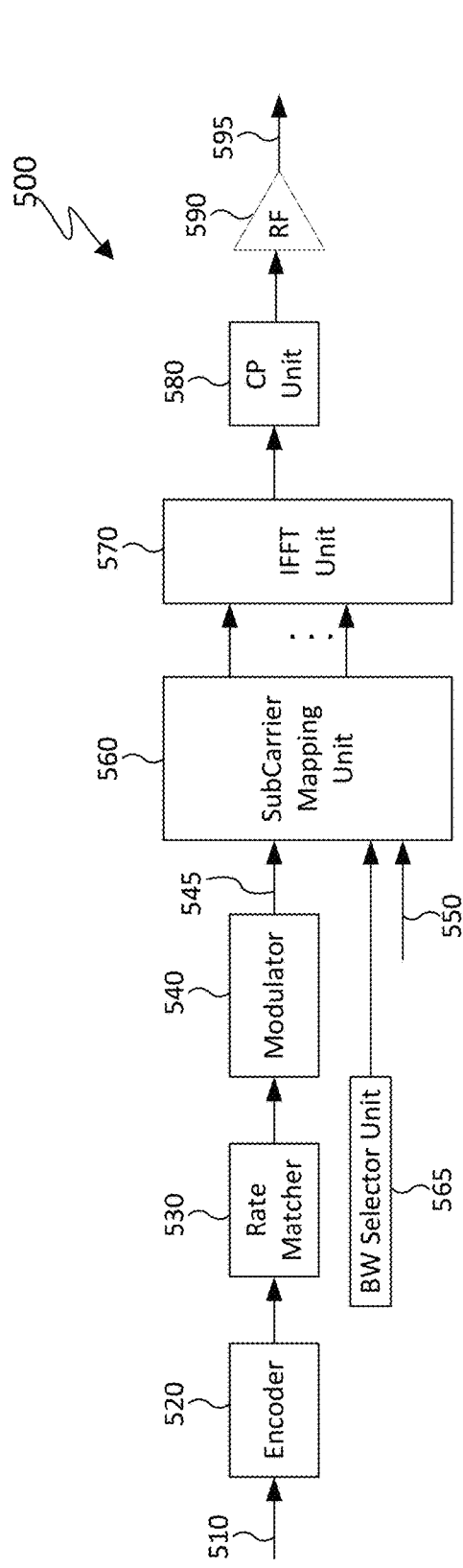
FIG. 5 illustrates an exemplary transmitter according to various embodiments of this disclosure.

FIG. 5 illustrates an exemplary transmitter according to various embodiments of this disclosure. The transmitter 500 can be implemented in an electronic device communicating via wireless communication network, such as gNB 101 or UE 111.

Information bits 510, such as DCI bits or data bits, are encoded by encoder 520 and then rate matched to assigned time/frequency resources by rate matcher 530. The output from rate matcher 530 is modulated by modulator 540. The modulated and encoded symbols 545 and DMRS or CSI-RS 550 are mapped by SC mapping unit 560 based on SCs selected by BW selector unit 565. An inverse fast Fourier transform (IFFT) is performed by IFFT unit 570 and a cyclic prefix (CP) is added by CP insertion unit 580. The resulting signal is filtered by filter 590 to generated filtered signal 595, which is transmitted by a radio frequency (RF) unit (not shown).

Figure 6:
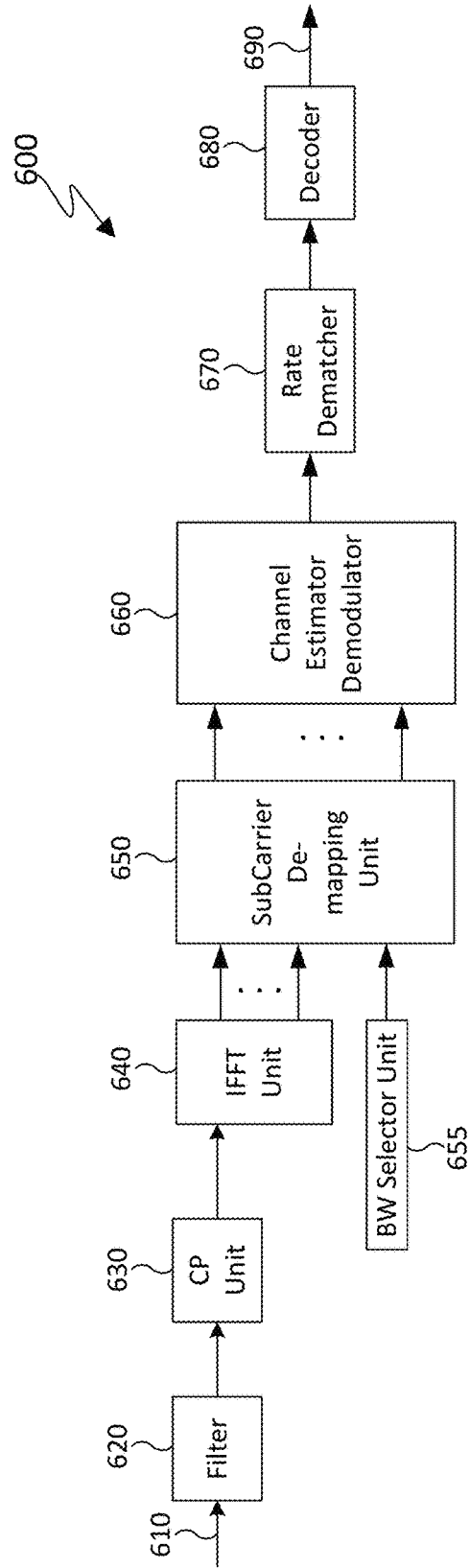
FIG. 6 illustrates an exemplary receiver according to various embodiments of this disclosure.

FIG. 6 illustrates an exemplary receiver according to various embodiments of this disclosure. The receiver 600 can be implemented in an electronic device communicating via wireless communication network, such as gNB 101 or UE 111.

A received signal 610 is filtered by filter 620 and then passed through a CP removal unit 630 that removes a cyclic prefix. IFFT unit 640 applies a fast Fourier transform (FFT) and the resulting signals are provided to SCs de-mapping unit 650. The SC de-mapping unit 650 de-maps SCs selected by BW selector unit 655. Received symbols are demodulated by a channel estimator and demodulator unit 660. A rate de-matcher 670 restores a rate matching and a decoder 280 decodes the resulting bits to provide information bits 690.

Each of the gNBs 101-103 may implement a transmit path 400 for transmitting in the downlink to UEs 111-116 and may implement a receiver 600 for receiving in the uplink from UEs 111-116. Similarly, each of UEs 111-116 may implement a transmit path 400 for transmitting in the uplink to gNBs 101-103 and may implement a receiver 600 for receiving in the downlink from gNBs 101-103.

As described in more detail below, the transmitter 500 and receiver 600 can be included in UEs and BSs, such as UE 116 and BS 102, for facilitating downlink synchronization, management of HARQ transmissions, and/or implementation of enhanced PRACH preamble formats.

Each of the components in FIGS. 5 and 6 can be implemented using only hardware or using a combination of hardware and software/firmware. As a particular example, at least some of the components in FIGS. 5 and 6 may be implemented in software, while other components may be implemented by configurable hardware or a mixture of software and configurable hardware. For instance, the IFFT block 570 may be implemented as configurable software algorithms.

Furthermore, although described as using IFFT, this is by way of illustration only and should not be construed to limit the scope of this disclosure. Other types of transforms, such as Discrete Fourier Transform (DFT) and Inverse Discrete Fourier Transform (IDFT) functions, could be used.

Although FIGS. 5 and 6 illustrate examples of wireless transmitters and receivers, various changes may be made. For example, various components in FIGS. 5 and 6 could be combined, further subdivided, or omitted and additional components could be added according to particular needs. Also, FIGS. 5 and 6 are meant to illustrate examples of the types of transmitters and receivers that could be used in a wireless network. Any other suitable architectures could be used to support wireless communications in a wireless network.

As discussed below, downlink synchronization in NTN can be achieved through SS/PBCH Block Design, Configuration of CORESET #0, and/or Enhancement for Downlink Synchronization Procedure.

Figure 7:
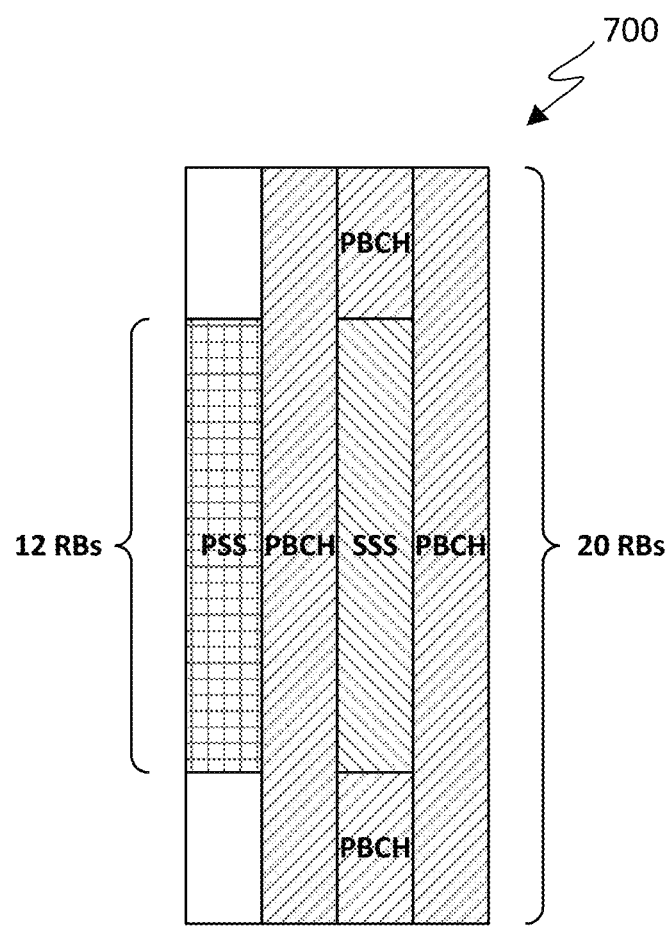
FIG. 7 illustrates an SS/PBCH block composition for NR Rel-15 according to various embodiments of this disclosure.

FIG. 7 illustrates an SS/PBCH block composition for NR Rel-15 according to various embodiments of this disclosure. NR Rel-15 supports multiple synchronization signals and physical broadcast channel blocks (SS/PBCH block or SSB) on each carrier frequency range.

Each SS/PBCH block 700 has four consecutive orthogonal frequency division multiplexing (OFDM) symbols. The first symbol is mapped for primary synchronization signal (PSS), the second and forth symbols are mapped for PBCH, and the third symbol is mapped for both secondary synchronization signal (SSS) and PBCH. The same SS/PBCH block composition is applied to all supported carrier frequency ranges in NR, which spans from 0 GHz to 52.6 GHz. The transmission bandwidth of PSS and SSS (e.g. 12 resource blocks (RBs)) is smaller than the transmission bandwidth of the whole SS/PBCH block (e.g. 20 RBs). In every RB mapped for PBCH, 3 out of the 12 resource elements (REs) are mapped for the demodulation reference signal (DMRS) of PBCH and the 3 REs are uniformly distributed in the PRB and the starting location of the first RE is based on cell identity (ID). Moreover, NR Rel-15 supports one or two subcarrier spacing (SCS) for SS/PBCH block, for a given band, with the same SCS is utilized for PSS, SSS, and PBCH (including its DMRS). For carrier frequency range 0 GHz to 6 GHz, 15 kHz and/or 30 kHz can be utilized for the SCS of SS/PBCH block. For carrier frequency range 6 GHz to 52.6 GHz, 120 kHz and/or 240 kHz can be utilized for the SCS of the SS/PBCH block.

In some embodiments, the sequence constructing PSS is based on M-sequence with cyclic shifts to represent the cell ID information carried by PSS, and the sequence constructing SSS is based on Gold-sequence (exclusive or of two M-sequences). Each M-sequence constructing the Gold-sequence performs cyclic shift to represent the cell ID information carried by SSS.

Figure 8:
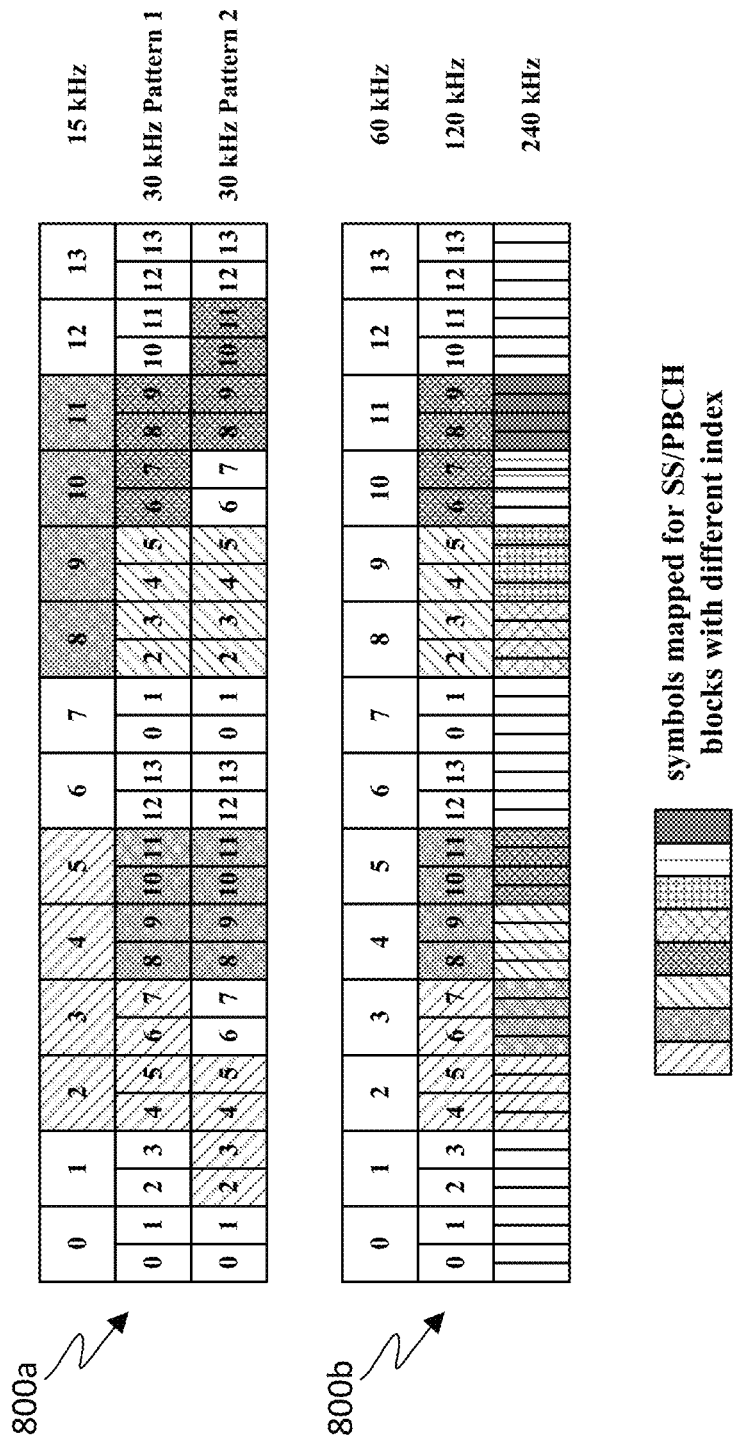
FIG. 8 illustrates an SS/PBCH block pattern in time domain for NR Rel-15 according to various embodiments of this disclosure.

FIG. 8 illustrates SS/PBCH block patterns in time domain for NR Rel-15 according to various embodiments of this disclosure.

In NR Rel-15, SS/PBCH blocks could be transmitted in a beam-sweeping way up to network implementation, and multiple candidate locations for transmitting SS/PBCH blocks are predefined within a unit of half frame. The mapping pattern 800a of SS/PBCH blocks to 1 slot with respect to 15 kHz as the reference SCS for frequency range 1 (FR1) is from 410 MHz to 7.125 GHz and the mapping pattern 800b with respect to 60 kHz as the reference SCS for frequency range 2 (FR2) is from 24.25 GHz to 52.6 GHz, as can be seen in FIG. 8. Two mapping patterns are designed for 30 kHz SCS of the SS/PBCH block. Pattern 1 is utilized for non-LTE-NR coexistence bands and Pattern 2 is utilized for LTE-NR coexistence bands.

Figure 9:
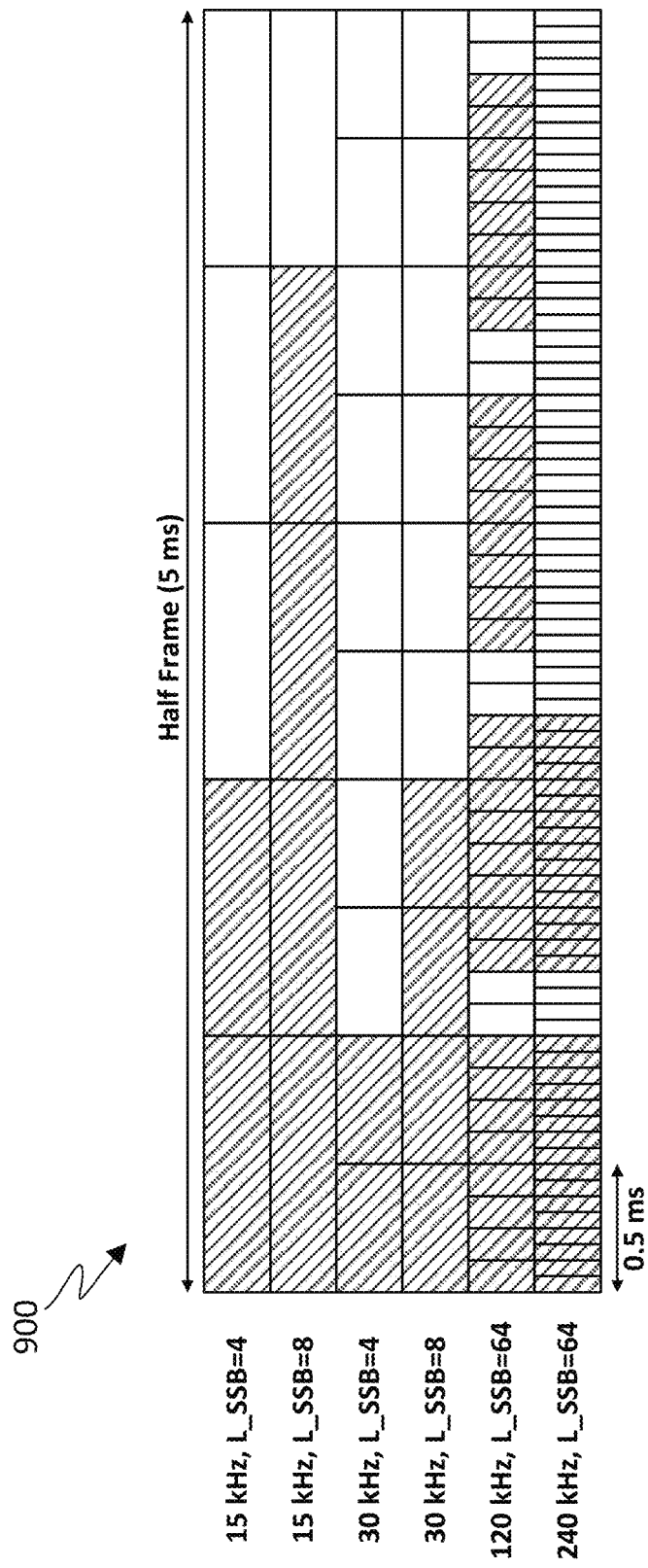
FIG. 9 illustrates an SS/PBCH block location within a half frame for NR Rel-15 according to various embodiments of this disclosure.

FIG. 9 illustrates an SS/PBCH block location within a half frame for NR Rel-15 according to various embodiments of this disclosure.

The maximum number of SS/PBCH blocks in a period, denoted as L_SSB, is determined based on carrier frequency range. For carrier frequency range 0 GHz to 3 GHz, L_SSB is 4; for carrier frequency range 3 GHz to 6 GHz, L_SSB is 8; for carrier frequency range 6 GHz to 52.6 GHz, L_SSB is 64. The determination of the slots within the half frame unit 900 which contains the candidate locations of SS/PBCH blocks, with respect to each combination of SSB SCS and L_SSB, is depicted in FIG. 9.

In initial cell selection, a user equipment (UE) assumes a default SSB burst set periodicity as 20 ms, and for detecting non-standalone NR cell, network provides one SSB burst set periodicity information per frequency carrier to UE and information to derive measurement timing/duration if possible.

Due to the delay spread between transmitters and receivers in an NTN, NR enhancements are proposed to address downlink synchronization issues in NTN. Aspects of downlink synchronization includes SS/PBCH block design, configuration of CORESET #0, and enhancement of the downlink (DL) synchronization procedure.

In NTN, the satellite or UAS platform typically generate several beams over a given service area bounded by its field of view. The footprints of the beams are typically of elliptic shape and depend on the on board antenna diagram and minimum elevation angle. An illustration of the footprints of the beams is shown in FIG. 10.

FIG. 10 illustrates beam footprints generated by a satellite according to various embodiments of this disclosure. In particular, TNT 1000 includes satellite 154 generating beam footprints 1002, each of which corresponds to one cell. In one aspect of this embodiment, there can be frequency reuse between different footprints, e.g. for footprints with far enough distance.

In one approach, a UE in a given footprint can assume there is at most one SS/PBCH block transmitted within a periodicity of SS/PBCH block transmission. In one example, if there is no frequency reuse between different footprints, there is at most one SS/PBCH block transmitted on each frequency layer corresponding to a synchronization raster. In another example, if there is frequency reuse between different footprints, there can be multiple SS/PBCH blocks transmitted on each frequency layer corresponding to a synchronization raster, but at most one of them is assumed by the UE within a given footprint.

In another approach, a UE in a given footprint assumes there can be at most one or multiple SS/PBCH blocks transmitted within a periodicity of SS/PBCH block transmission, and the UE within the given footprint further assumes the SS/PBCH block(s) transmitted on a given frequency layer are quasi-co-located (QCLed). In one aspect, the number of QCLed SS/PBCH blocks within a periodicity can be predefined in the specification, and a UE assumes the QCLed SS/PBCH blocks are all transmitted if detecting any of them. In another aspect, the indication of actually transmitted QCLed SS/PBCH blocks within a periodicity is by remaining minimum system information (RMSI) content, e.g. a bitmap.

In another embodiment, a UE assumes at least one footprint corresponds to one cell.

In one approach, a UE in a given footprint assumes there is at most one SS/PBCH block transmitted within a periodicity of SS/PBCH block transmission.

In another approach, a UE in a given footprint assumes there can be at most one or multiple SS/PBCH blocks transmitted within a periodicity of SS/PBCH block transmission, and the UE within the given footprint further assumes the SS/PBCH block(s) transmitted on a given frequency layer are QCLed. In one aspect, the number of QCLed SS/PBCH blocks within a periodicity is predefined in the spec, and a UE assumes the QCLed SS/PBCH blocks are all transmitted if detecting any of them. In another aspect, the indication of actually transmitted QCLed SS/PBCH blocks within a periodicity is by RMSI content, e.g. a bitmap.

In one embodiment, a band for operating NTN has 30 MHz minimum carrier bandwidth, which is 160 RBs in term of 15 kHz SCS or 78 RBs in term of 30 kHz SCS.

In one approach, 15 kHz SCS is supported for SS/PBCH block on the band for operating NTN with 30 MHz minimum carrier bandwidth, and the channel center of the band for operating NTN with 30 MHz minimum carrier bandwidth can variate with a small step size (e.g. 15 kHz or 30 kHz or 100 kHz).

In one example of this approach, CORESET #0 with 24 RBs bandwidth in term of 15 kHz SCS is supported and multiplexed with SS/PBCH block in a manner that they occur in different time instances and their bandwidth overlap, then the frequency offset between the lowest RB of CORESET #0 and lowest RB of SS/PBCH block can be configurable as 2 RB, in term of the SCS of CORESET #0.

In another example of this approach, CORESET #0 with 48 RBs bandwidth in term of 15 kHz SCS is supported and multiplexed with SS/PBCH block in a manner that they occur in different time instances and their bandwidth overlap, then the frequency offset between the lowest RB of CORESET #0 and lowest RB of SS/PBCH block can be configurable as one from 0 or 28 RB, in term of the SCS of CORESET #0.

In yet another example of this approach, CORESET #0 with 96 RBs bandwidth in term of 15 kHz SCS is supported and multiplexed with SS/PBCH block in a manner that they occur in different time instances and their bandwidth overlap, then the frequency offset between the lowest RB of CORESET #0 and lowest RB of SS/PBCH block can be configurable as one from 0, 38, or 76 RB, in term of the SCS of CORESET #0.

In yet another example of this approach, CORESET #0 with 24 RBs bandwidth in term of 30 kHz SCS is supported and multiplexed with SS/PBCH block in a manner that they occur in different time instances and their bandwidth overlap, then the frequency offset between the lowest RB of CORESET #0 and lowest RB of SS/PBCH block can be configurable as one from 0 or 14 RB, in term of the SCS of CORESET #0.

In yet another example of this approach, CORESET #0 with 48 RBs bandwidth in term of 30 kHz SCS is supported and multiplexed with SS/PBCH block in a manner that they occur in different time instances and their bandwidth overlap, then the frequency offset between the lowest RB of CORESET #0 and lowest RB of SS/PBCH block can be configurable as one from 0, 19, or 38 RB, in term of the SCS of CORESET #0.

In another approach, 30 kHz SCS is supported for SS/PBCH block on the band for operating NTN with 30 MHz minimum carrier bandwidth, and the channel center of the band for operating NTN with 30 MHz minimum carrier bandwidth can variate with a small step size (e.g. 15 kHz or 30 kHz or 100 kHz).

In one example of this approach, CORESET #0 with 48 RBs bandwidth in term of 15 kHz SCS is supported and multiplexed with SS/PBCH block in a manner that they occur in different time instances and their bandwidth overlap, then the frequency offset between the lowest RB of CORESET #0 and lowest RB of SS/PBCH block can be configurable as one from 0 or 8 RB, in term of the SCS of CORESET #0.

In another example of this approach, CORESET #0 with 96 RBs bandwidth in term of 15 kHz SCS is supported and multiplexed with SS/PBCH block in a manner that they occur in different time instances and their bandwidth overlap, then the frequency offset between the lowest RB of CORESET #0 and lowest RB of SS/PBCH block can be configurable as one from 0 or 56 RB, in term of the SCS of CORESET #0.

In yet another example of this approach, CORESET #0 with 24 RBs bandwidth in term of 30 kHz SCS is supported and multiplexed with SS/PBCH block in a manner that they occur in different time instances and their bandwidth overlap, then the frequency offset between the lowest RB of CORESET #0 and lowest RB of SS/PBCH block can be configurable as one from 0 or 4 RB, in term of the SCS of CORESET #0.

In yet another example of this approach, CORESET #0 with 48 RBs bandwidth in term of 30 kHz SCS is supported and multiplexed with SS/PBCH block in a manner that they occur in different time instances and their bandwidth overlap, then the frequency offset between the lowest RB of CORESET #0 and lowest RB of SS/PBCH block can be configurable as one from 0 or 28 RB, in term of the SCS of CORESET #0.

In yet another approach, 15 kHz SCS is supported for SS/PBCH block on the band for operating NTN with 30 MHz minimum carrier bandwidth, and the channel center of the band for operating NTN with 30 MHz minimum carrier bandwidth is fixed. For this approach, there can be single synchronization raster entry within a 30 MHz minimum carrier bandwidth, and the frequency offset between the lowest RB of CORESET #0 and lowest RB of SS/PBCH block can be fixed, if the multiplexing between CORESET #0 and SS/PBCH block is in a manner that they occur in different time instances and their bandwidth overlap, and the fixed frequency offset can be determined by the following if CORESET #0 and SS/PBCH block is center aligned in frequency domain:

$$F\_offset=(BW\_CORESET\ \#0-BW\_SSB*SCS\_SSB/SCS\_CORESET\ \#0)/2.$$

Alternatively, the fixed frequency offset can be determined by the following if CORESET #0 and SS/PBCH block is edge aligned (highest RB) in frequency domain:

$$F\_offset=BW\_CORESET\ \#0-BW\_SSB*SCS\_SSB/SCS\_CORESET\ \#0.$$

Alternatively, the fixed frequency offset can be determined by the following if CORESET #0 and SS/PBCH block is edge aligned (lowest RB) in frequency domain; where BW_CORESET #0 is the bandwidth of CORESET #0, BW_SSB is the bandwidth of SS/PBCH block, SCS_SSB is the SCS of SS/PBCH block, and SCS_CORESET #0 is the SCS of CORESET #0:

$$F\_offset=0.$$

In one example of this approach, CORESET #0 with 24 RBs bandwidth in term of 15 kHz SCS is supported and multiplexed with SS/PBCH block in a manner that they occur in different time instances and their bandwidth overlap, then the frequency offset between the lowest RB of CORESET #0 and lowest RB of SS/PBCH block can be fixed as 2 RB (e.g. center aligned), in term of the SCS of CORESET #0.

In another example of this approach, CORESET #0 with 24 RBs bandwidth in term of 15 kHz SCS is supported and multiplexed with SS/PBCH block in a manner that they occur in different time instances and their bandwidth overlap, then the frequency offset between the lowest RB of CORESET #0 and lowest RB of SS/PBCH block can be fixed as 0 RB or 4 RB (e.g. edge aligned), in term of the SCS of CORESET #0.

In yet another example of this approach, CORESET #0 with 48 RBs bandwidth in term of 15 kHz SCS is supported and multiplexed with SS/PBCH block in a manner that they occur in different time instances and their bandwidth overlap, then the frequency offset between the lowest RB of CORESET #0 and lowest RB of SS/PBCH block can be fixed as 14 RB (e.g. center aligned), in term of the SCS of CORESET #0.

In yet another example of this approach, CORESET #0 with 48 RBs bandwidth in term of 15 kHz SCS is supported and multiplexed with SS/PBCH block in a manner that they occur in different time instances and their bandwidth overlap, then the frequency offset between the lowest RB of CORESET #0 and lowest RB of SS/PBCH block can be fixed as 0 RB or 28 RB (e.g. edge aligned), in term of the SCS of CORESET #0.

In yet another example of this approach, CORESET #0 with 96 RBs bandwidth in term of 15 kHz SCS is supported and multiplexed with SS/PBCH block in a manner that they occur in different time instances and their bandwidth overlap, then the frequency offset between the lowest RB of CORESET #0 and lowest RB of SS/PBCH block can be fixed as 38 RB (e.g. center aligned), in term of the SCS of CORESET #0.

In yet another example of this approach, CORESET #0 with 96 RBs bandwidth in term of 15 kHz SCS is supported and multiplexed with SS/PBCH block in a manner that they occur in different time instances and their bandwidth overlap, then the frequency offset between the lowest RB of CORESET #0 and lowest RB of SS/PBCH block can be fixed as 0 RB or 76 RB (e.g. edge aligned), in term of the SCS of CORESET #0.

In yet another example of this approach, CORESET #0 with 144 RBs bandwidth in term of 15 kHz SCS is supported and multiplexed with SS/PBCH block in a manner that they occur in different time instances and their bandwidth overlap, then the frequency offset between the lowest RB of CORESET #0 and lowest RB of SS/PBCH block can be fixed as 62 RB (e.g. center aligned), in term of the SCS of CORESET #0.

In yet another example of this approach, CORESET #0 with 144 RBs bandwidth in term of 15 kHz SCS is supported and multiplexed with SS/PBCH block in a manner that they occur in different time instances and their bandwidth overlap, then the frequency offset between the lowest RB of CORESET #0 and lowest RB of SS/PBCH block can be fixed as 0 RB or 124 RB (e.g. edge aligned), in term of the SCS of CORESET #0.

In yet another example of this approach, CORESET #0 with 24 RBs bandwidth in term of 30 kHz SCS is supported and multiplexed with SS/PBCH block in a manner that they occur in different time instances and their bandwidth overlap, then the frequency offset between the lowest RB of CORESET #0 and lowest RB of SS/PBCH block can be fixed as 7 RB (e.g. center aligned), in term of the SCS of CORESET #0.

In yet another example of this approach, CORESET #0 with 24 RBs bandwidth in term of 30 kHz SCS is supported and multiplexed with SS/PBCH block in a manner that they occur in different time instances and their bandwidth overlap, then the frequency offset between the lowest RB of CORESET #0 and lowest RB of SS/PBCH block can be fixed as 0 RB or 14 RB (e.g. edge aligned), in term of the SCS of CORESET #0.

In yet another example of this approach, CORESET #0 with 48 RBs bandwidth in term of 30 kHz SCS is supported and multiplexed with SS/PBCH block in a manner that they occur in different time instances and their bandwidth overlap, then the frequency offset between the lowest RB of CORESET #0 and lowest RB of SS/PBCH block can be fixed as 19 RB (e.g. center aligned), in term of the SCS of CORESET #0.

In yet another example of this approach, CORESET #0 with 48 RBs bandwidth in term of 30 kHz SCS is supported and multiplexed with SS/PBCH block in a manner that they occur in different time instances and their bandwidth overlap, then the frequency offset between the lowest RB of CORESET #0 and lowest RB of SS/PBCH block can be fixed as 0 RB or 38 RB (e.g. edge aligned), in term of the SCS of CORESET #0.

In yet another example of this approach, CORESET #0 with 72 RBs bandwidth in term of 30 kHz SCS is supported and multiplexed with SS/PBCH block in a manner that they occur in different time instances and their bandwidth overlap, then the frequency offset between the lowest RB of CORESET #0 and lowest RB of SS/PBCH block can be fixed as 31 RB (e.g. center aligned), in term of the SCS of CORESET #0.

In yet another example of this approach, CORESET #0 with 72 RBs bandwidth in term of 30 kHz SCS is supported and multiplexed with SS/PBCH block in a manner that they occur in different time instances and their bandwidth overlap, then the frequency offset between the lowest RB of CORESET #0 and lowest RB of SS/PBCH block can be fixed as 0 RB or 62 RB (e.g. edge aligned), in term of the SCS of CORESET #0.

The performance of downlink synchronization could be degraded due to the Doppler shift, and hence, there is a need for enhancement to the downlink synchronization procedure.

In one embodiment, a UE operated for NTN assumes SS/PBCH blocks within a periodicity (e.g. 20 ms for initial access purpose) can be repeated in time domain for coverage enhancement. The repetition is in terms of the QCL assumption and particular signal/channel (e.g. DMRS sequence of PBCH) can vary in the repeated SS/PBCH blocks.

In one approach, a UE assumes the SS/PBCH blocks with SS/PBCH blocks index i and i+1 are QCLed, where i is an even number. For example, the two SS/PBCH blocks within the same slot are QCLed. In one aspect of this approach, the UE assumes the QCLed SS/PBCH blocks are either both transmitted or both not transmitted. In another expect of this approach, the UE assumes the bitmap for indicating the actually transmitted SS/PBCH blocks taking the same value (e.g. either 0 or 1) for the (i−1)-th and i-th bit.

In another approach, a UE assumes the SS/PBCH blocks are all QCLed within a periodicity of SS/PBCH block transmission. In one example, the number of actually transmitted SS/PBCH blocks can be fixed for NTN, and all the actually transmitted SS/PBCH blocks are assumed to be QCLed. In another example, the number of actually transmitted SS/PBCH blocks can be configurable, and all the actually transmitted SS/PBCH blocks are assumed to be QCLed.

In yet another approach, a UE assumes SS/PBCH blocks are repeated based on its capability of Global Navigation Satellite System (GNSS). For example, if a UE is not capable of GNSS, the UE may assume SS/PBCH blocks within a periodicity (e.g. 20 ms for initial access purpose) can be repeated.

In another embodiment, a UE assumes at least one numerology for SS/PBCH block detection in initial access procedure, and the UE may need to blind detect the numerology of SS/PBCH block if the supported numerologies are more than 1.

In one approach, if the UE is capable of distinguishing the type of payload, e.g. either transparent or a regenerative, the UE can determine a single numerology of SS/PBCH block in the initial access.

In yet another embodiment, a UE operated for NTN assumes SS/PBCH blocks can be repeated in frequency domain for coverage enhancement, where the repetition refers to the QCL assumption and particular signal/channel (e.g. PSS/SSS) can vary in the repeated SS/PBCH blocks.

Figure 11:
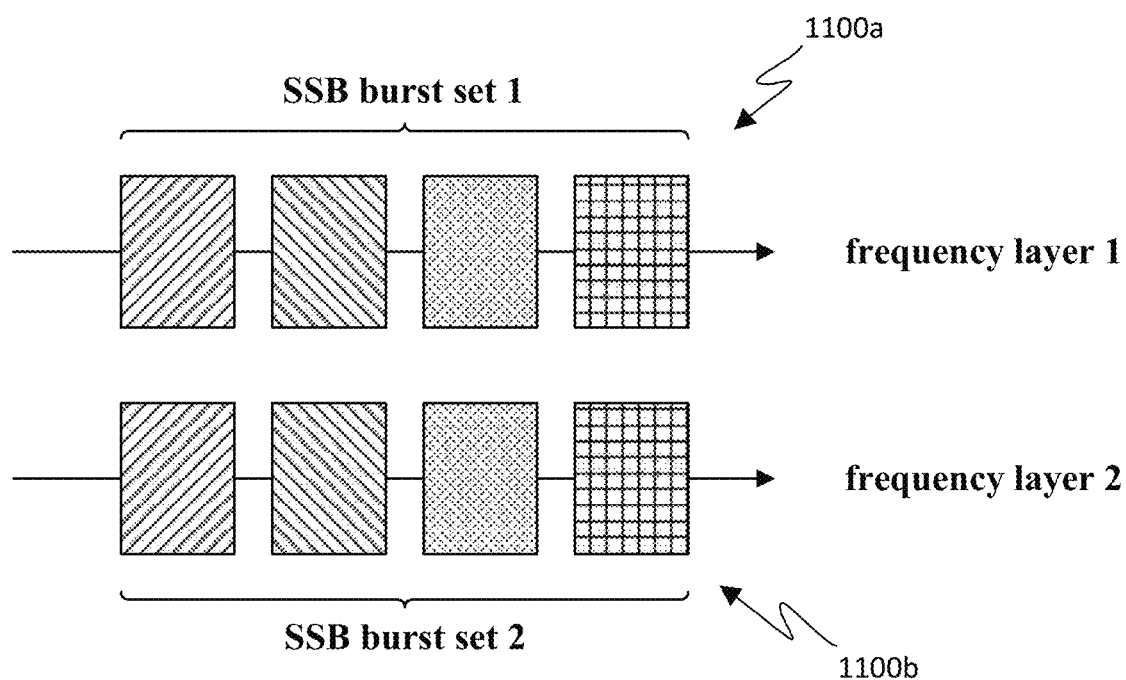
FIG. 11 illustrates frequency repetition of SSBs according to various embodiments of this disclosure.

FIG. 11 illustrates an example of SS/PBCH block repetition in the frequency domain according to various embodiments of this disclosure.

In one aspect, the number of repeated SS/PBCH blocks in frequency domain is fixed. For example, a UE assumes a SS/PBCH block burst 1100a set is repeated once in another frequency location as SS/PBCH block burst 1100b.

In another aspect, a UE assumes a SS/PBCH block burst set and its repetition(s) share the same time-domain information on transmission, including at least one of periodicity, half frame containing its transmission, or actually transmitted SS/PBCH blocks.

In yet another aspect, a UE assumes the numerology of the first SS/PBCH block burst set and its repetition(s) is the same.

In yet another aspect, a UE assumes a first SS/PBCH block in a SS/PBCH block burst set is QCLed with a second SS/PBCH block in the repeated SS/PBCH block burst set in frequency domain, if the first SS/PBCH block and the second SS/PBCH block have the same SS/PBCH block index.

In yet another aspect, a UE may assume a first SS/PBCH block burst set is located on a synchronization raster entry, and the first SS/PBCH block burst set serves as cell-defining SS/PBCH blocks, and the repetition(s) of the first SS/PBCH block burst set is not located on synchronization raster entries (such that they are not visible in initial cell search).

In yet another aspect, a UE may assume a fixed relative location in frequency domain between the first SS/PBCH block burst set and its repetition(s). In one approach, the offset between the lowest RB of the first SS/PBCH block burst set and the lowest RB of its repetition can be fixed. For one example, the offset is fixed as 20 RBs (e.g. the two SS/PBCH block burst sets are adjacent to each other in the frequency domain and no frequency gap in between).

In yet another aspect, a UE may assume a fixed relationship between the cell ID carried by the first SS/PBCH block burst set and its repetition(s). In one approach, a UE may assume the cell ID carried by the first SS/PBCH block burst set is the same as the cell ID carried by its repetition(s). In another approach, a UE may assume the cell ID carried by the first SS/PBCH block burst set has a fixed offset comparing to the cell ID carried by its repetition(s). For one example of this approach, the cell IDs for the group of SS/PBCH block burst set and its repetition(s) are consecutive and increase according to the frequency location within the group.

FIG. 12 illustrates conventional PRACH preamble formats with long sequences, and FIG. 13 illustrates conventional PRACH preamble formats with short sequences. Aspects of the enhanced PRACH preamble format design according to various embodiments of this disclosure can be directed to the sequence length used for PRACH preamble, the SCS supported for PRACH preamble, and the PRACH preamble composition. Two sets of PRACH preamble formats are described in the disclosure. The first set of PRACH preamble formats is based on a SCS scaled from 1.25 kHz, and the second set of PRACH preamble formats is based on a SCS scaled from 15 kHz.

In one embodiment, an enhancement PRACH preamble format is with a ZC-sequence (e.g. denoted as L_RA) having a length that is at least 839 (e.g. L_RA≥839) and a subcarrier spacing (e.g. denoted as SCS_RA) that is scaled from 1.25 kHz (e.g. SCS_RA=1.25 kHz/p).

For example, at least one of the following L_RA in TABLE 1 can be supported.

TABLE 1

Example of ZC-sequence length.

| Index | L_RA |
|---|---|
| 1 | 839 |
| 2 | 1723 |
| 3 | 3449 |
| 4 | 6911 |

In one approach of this embodiment, a PRACH format with no gap reserved after the sequence is supported.

Figure 14A:
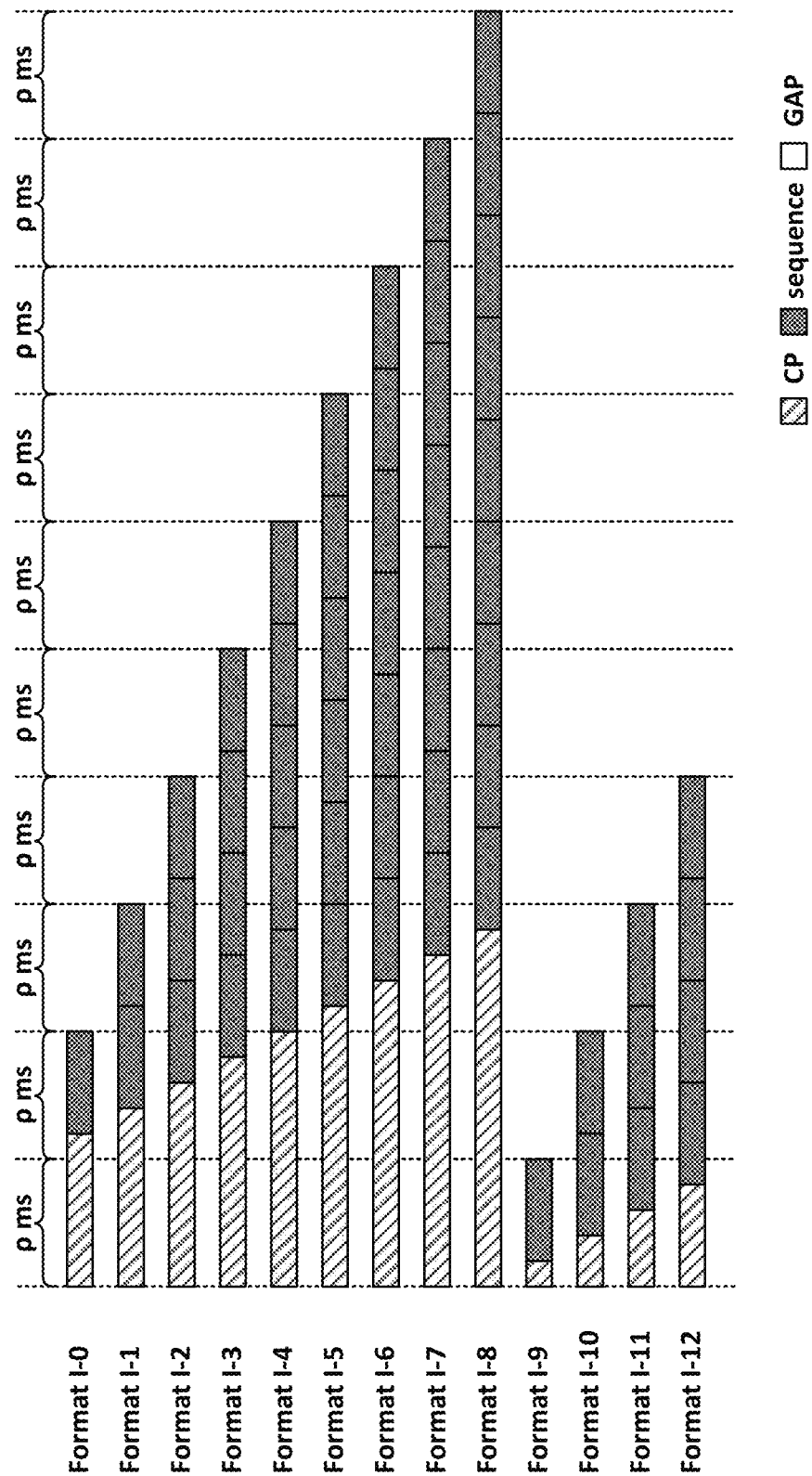
FIGS. 14A and 14B illustrate exemplary PRACH formats according to various embodiments of this disclosure.
Figure 14B:
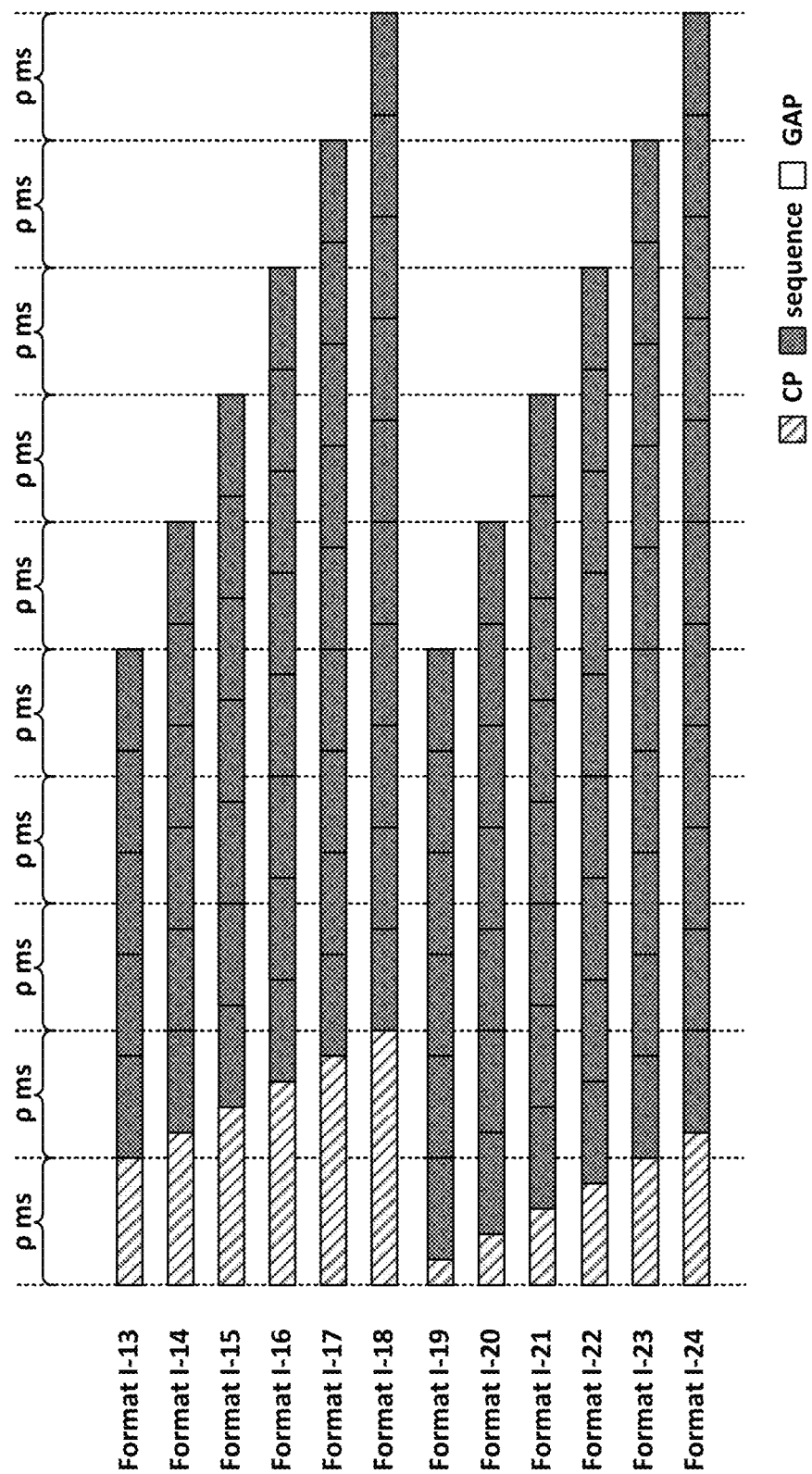

FIGS. 14A and 14B illustrate exemplary PRACH formats with no gap reserved according to various embodiments of this disclosure. These PRACH formats are also shown in TABLE 2. In this example, the ZC-sequence length (e.g. L_RA) can be one from the examples in TABLE 1, and the SCS (e.g. SCS_RA) can be scaled from 1.25 kHz such that SCS_RA=1.25/ρ, where ρ is the SCS scaling factor with respect to 1.25 kHz (e.g. p could be in the form of ρ=2^v, where v is an integer, positive, zero, or negative). Note that the N_CP, N_SEQ, and N_total are scaling with ρ.

TABLE 2

Example PRACH preamble formats.

| Format | L_RA | SCS_RA (kHz) | N_CP (κ) | N_SEQ (κ) | N_GAP (κ) | N_total (ms) |
|---|---|---|---|---|---|---|
| I-0 | ≥839 | 1.25/ρ | 36864*ρ | 1*24576*ρ | 0 | 2*ρ |
| I-1 | ≥839 | 1.25/ρ | 43008*ρ | 2*24576*ρ | 0 | 3*ρ |
| I-2 | ≥839 | 1.25/ρ | 49152*ρ | 3*24576*ρ | 0 | 4*ρ |
| I-3 | ≥839 | 1.25/ρ | 55296*ρ | 4*24576*ρ | 0 | 5*ρ |
| I-4 | ≥839 | 1.25/ρ | 61440*ρ | 5*24576*ρ | 0 | 6*ρ |
| I-5 | ≥839 | 1.25/ρ | 67584*ρ | 6*24576*ρ | 0 | 7*ρ |
| I-6 | ≥839 | 1.25/ρ | 73728*ρ | 7*24576*ρ | 0 | 8*ρ |
| I-7 | ≥839 | 1.25/ρ | 79872*ρ | 8*24576*ρ | 0 | 9*ρ |
| I-8 | ≥839 | 1.25/ρ | 86016*ρ | 9*24576*ρ | 0 | 10*ρ |
| I-9 | ≥839 | 1.25/ρ | 6144*ρ | 1*24576*ρ | 0 | 1*ρ |
| I-10 | ≥839 | 1.25/ρ | 12288*ρ | 2*24576*ρ | 0 | 2*ρ |
| I-11 | ≥839 | 1.25/ρ | 18432*ρ | 3*24576*ρ | 0 | 3*ρ |
| I-12 | ≥839 | 1.25/ρ | 24576*ρ | 4*24576*ρ | 0 | 4*ρ |
| I-13 | ≥839 | 1.25/ρ | 30720*ρ | 5*24576*ρ | 0 | 5*ρ |
| I-14 | ≥839 | 1.25/ρ | 36864*ρ | 6*24576*ρ | 0 | 6*ρ |

TABLE 2-continued

Example PRACH preamble formats.

| Format | L_RA | SCS_RA (kHz) | N_CP (κ) | N_SEQ (κ) | N_GAP (κ) | N_total (ms) |
|---|---|---|---|---|---|---|
| I-15 | ≥839 | 1.25/ρ | 43008*ρ | 7*24576*ρ | 0 | 7*ρ |
| I-16 | ≥839 | 1.25/ρ | 49152*ρ | 8*24576*ρ | 0 | 8*ρ |
| I-17 | ≥839 | 1.25/ρ | 55296*ρ | 9*24576*ρ | 0 | 9*ρ |
| I-18 | ≥839 | 1.25/ρ | 61440*ρ | 10*24576*ρ | 0 | 10*ρ |
| I-19 | ≥839 | 1.25/ρ | 6144*ρ | 6*24576*ρ | 0 | 5*ρ |
| I-20 | ≥839 | 1.25/ρ | 12288*ρ | 7*24576*ρ | 0 | 6*ρ |
| I-21 | ≥839 | 1.25/ρ | 18432*ρ | 8*24576*ρ | 0 | 7*ρ |
| I-22 | ≥839 | 1.25/ρ | 24576*ρ | 9*24576*ρ | 0 | 8*ρ |
| I-23 | ≥839 | 1.25/ρ | 30720*ρ | 10*24576*ρ | 0 | 9*ρ |
| I-24 | ≥839 | 1.25/ρ | 36864*ρ | 11*24576*ρ | 0 | 10*ρ |

In another approach of this embodiment, a PRACH format with gap reserved after the sequence is supported.

Figure 15A:
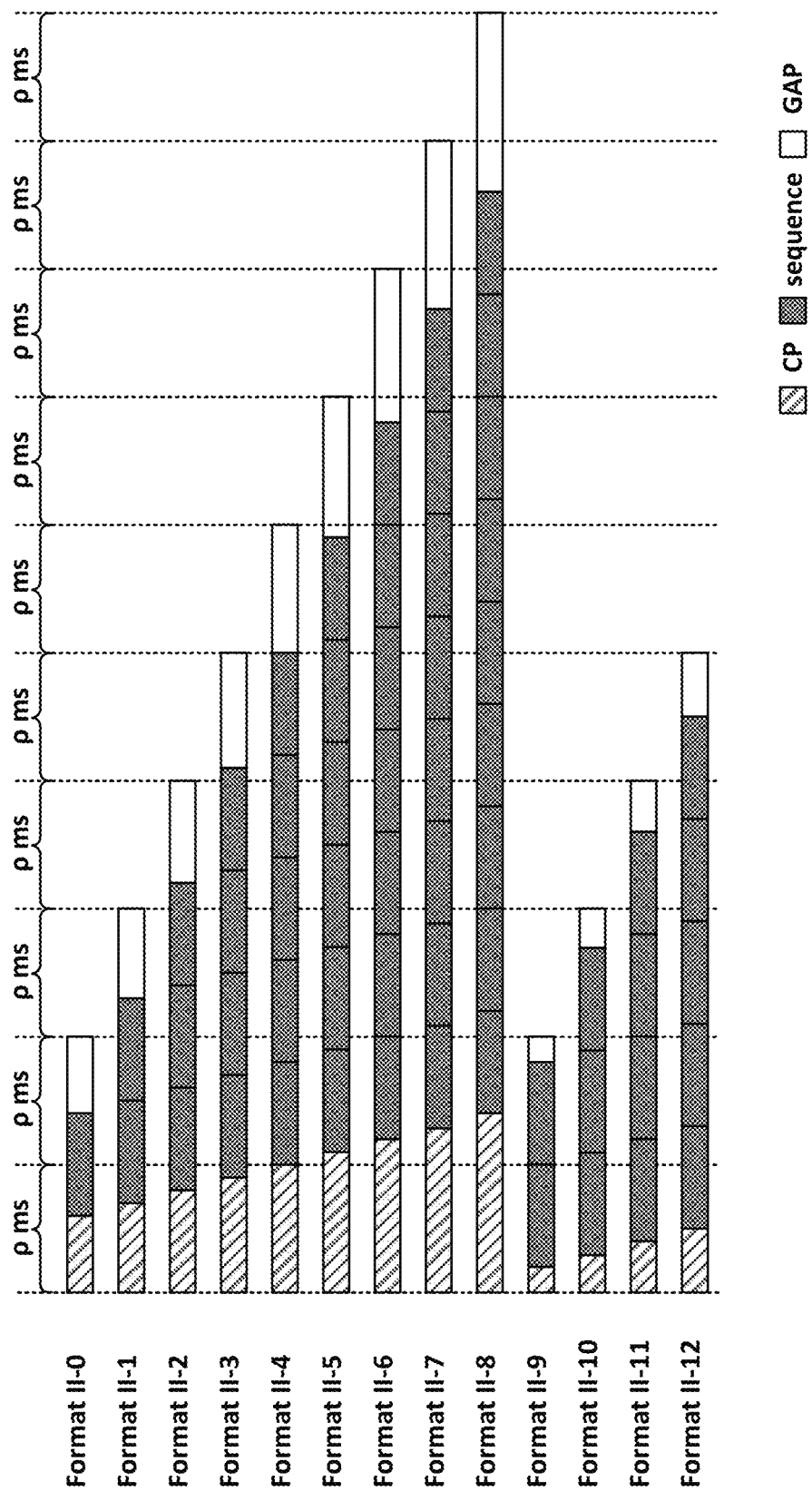
FIGS. 15A and 15B illustrate additional exemplary PRACH formats according to various embodiments of this disclosure.
Figure 15B:
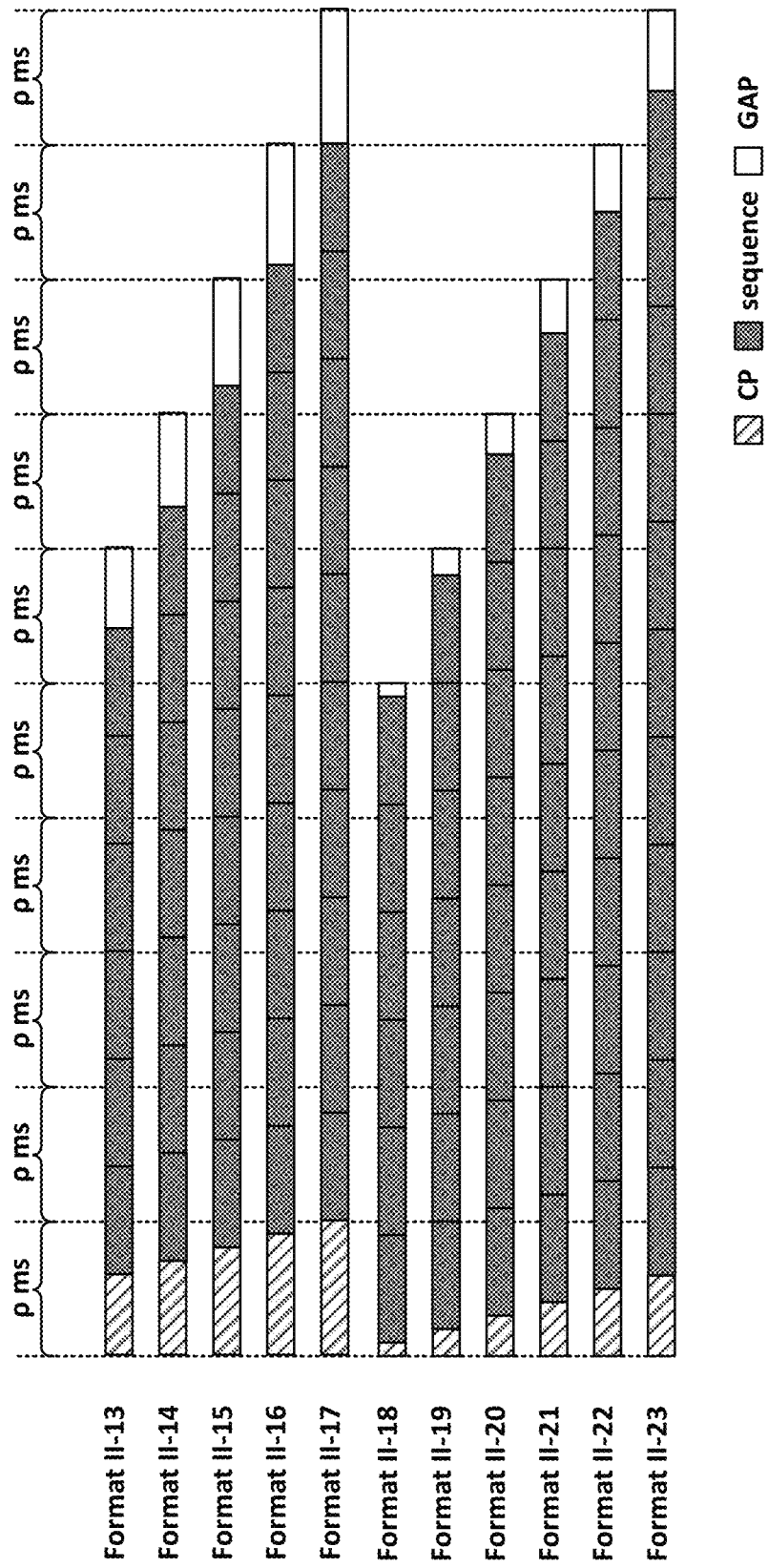

FIGS. 15A and 15B illustrate PRACH formats with a gap reserved in accordance with various embodiments of this disclosure. These exemplary PRACH formats are also shown in TABLE 3.

The ZC-sequence length (e.g. L_RA) can be one from the examples in TABLE 1, and the SCS (e.g. SCS_RA) can be scaled from 1.25 kHz such that SCS_RA=1.25/ρ, where ρ is the SCS scaling factor with respect to 1.25 kHz (e.g. p could be in the form of ρ=2^v, where v is an integer, positive, zero, or negative). Note that the N_CP, N_SEQ, N_GAP, and N_total are scaling with ρ.

TABLE 3

Example PRACH preamble formats.

| Format | L_RA | SCS_RA (kHz) | N_CP (κ) | N_SEQ (κ) | N_GAP (κ) | N_total (ms) |
|---|---|---|---|---|---|---|
| I-0 | ≥839 | 1.25/ρ | 18504*ρ | 1*24576*ρ | 18360*ρ | 2*ρ |
| I-1 | ≥839 | 1.25/ρ | 21576*ρ | 2*24576*ρ | 21432*ρ | 3*ρ |
| I-2 | ≥839 | 1.25/ρ | 24648*ρ | 3*24576*ρ | 24504*ρ | 4*ρ |
| I-3 | ≥839 | 1.25/ρ | 27720*ρ | 4*24576*ρ | 27576*ρ | 5*ρ |
| I-4 | ≥839 | 1.25/ρ | 30792*ρ | 5*24576*ρ | 30648*ρ | 6*ρ |
| I-5 | ≥839 | 1.25/ρ | 33864*ρ | 6*24576*ρ | 33720*ρ | 7*ρ |
| I-6 | ≥839 | 1.25/ρ | 36936*ρ | 7*24576*ρ | 36792*ρ | 8*ρ |
| I-7 | ≥839 | 1.25/ρ | 40008*ρ | 8*24576*ρ | 39864*ρ | 9*ρ |
| I-8 | ≥839 | 1.25/ρ | 43080*ρ | 9*24576*ρ | 42936*ρ | 10*ρ |
| I-9 | ≥839 | 1.25/ρ | 6216*ρ | 2*24576*ρ | 6072*ρ | 2*ρ |
| I-10 | ≥839 | 1.25/ρ | 9288*ρ | 3*24576*ρ | 9144*ρ | 3*ρ |
| I-11 | ≥839 | 1.25/ρ | 12360*ρ | 4*24576*ρ | 12216*ρ | 4*ρ |
| I-12 | ≥839 | 1.25/ρ | 15432*ρ | 5*24576*ρ | 15288*ρ | 5*ρ |
| I-13 | ≥839 | 1.25/ρ | 18504*ρ | 6*24576*ρ | 18360*ρ | 6*ρ |
| I-14 | ≥839 | 1.25/ρ | 21576*ρ | 7*24576*ρ | 21432*ρ | 7*ρ |
| I-15 | ≥839 | 1.25/ρ | 24648*ρ | 8*24576*ρ | 24504*ρ | 8*ρ |
| I-16 | ≥839 | 1.25/ρ | 27720*ρ | 9*24576*ρ | 27576*ρ | 9*ρ |
| I-17 | ≥839 | 1.25/ρ | 30792*ρ | 10*24576*ρ | 30648*ρ | 10*ρ |
| I-18 | ≥839 | 1.25/ρ | 3144*ρ | 6*24576*ρ | 3000*ρ | 5*ρ |
| I-19 | ≥839 | 1.25/ρ | 6216*ρ | 7*24576*ρ | 6072*ρ | 6*ρ |
| I-20 | ≥839 | 1.25/ρ | 9288*ρ | 8*24576*ρ | 9144*ρ | 7*ρ |
| I-21 | ≥839 | 1.25/ρ | 12360*ρ | 9*24576*ρ | 12216*ρ | 8*ρ |
| I-22 | ≥839 | 1.25/ρ | 15432*ρ | 10*24576*ρ | 15288*ρ | 9*ρ |
| I-23 | ≥839 | 1.25/ρ | 18504*ρ | 11*24576*ρ | 18360*ρ | 10*ρ |

In one embodiment, an enhancement PRACH preamble format is with a ZC-sequence (e.g. denoted as L_RA) with a length that is at least 139 (e.g. L_RA≥139) and a subcarrier spacing (e.g. denoted as SCS_RA) that is scaled from 15 kHz (e.g. SCS_RA=15/ρ).

For example, at least one of the following L_RA in TABLE 4 can be supported, and the SCS_RA=15/ρ, where ρ is the SCS ratio with respect to 15 kHz (e.g. ρ could be in the form of ρ=2^v, where v is an integer, positive, zero, or negative).

TABLE 4

Example of ZC-sequence length.

| Index | L_RA |
|---|---|
| 1 | 139 |
| 2 | 283 |
| 3 | 571 |
| 4 | 1151 |
| 5 | 2297 |
| 6 | 4603 |

In one approach of this embodiment, a PRACH format with no gap reserved after the sequence is supported.

Figure 16:
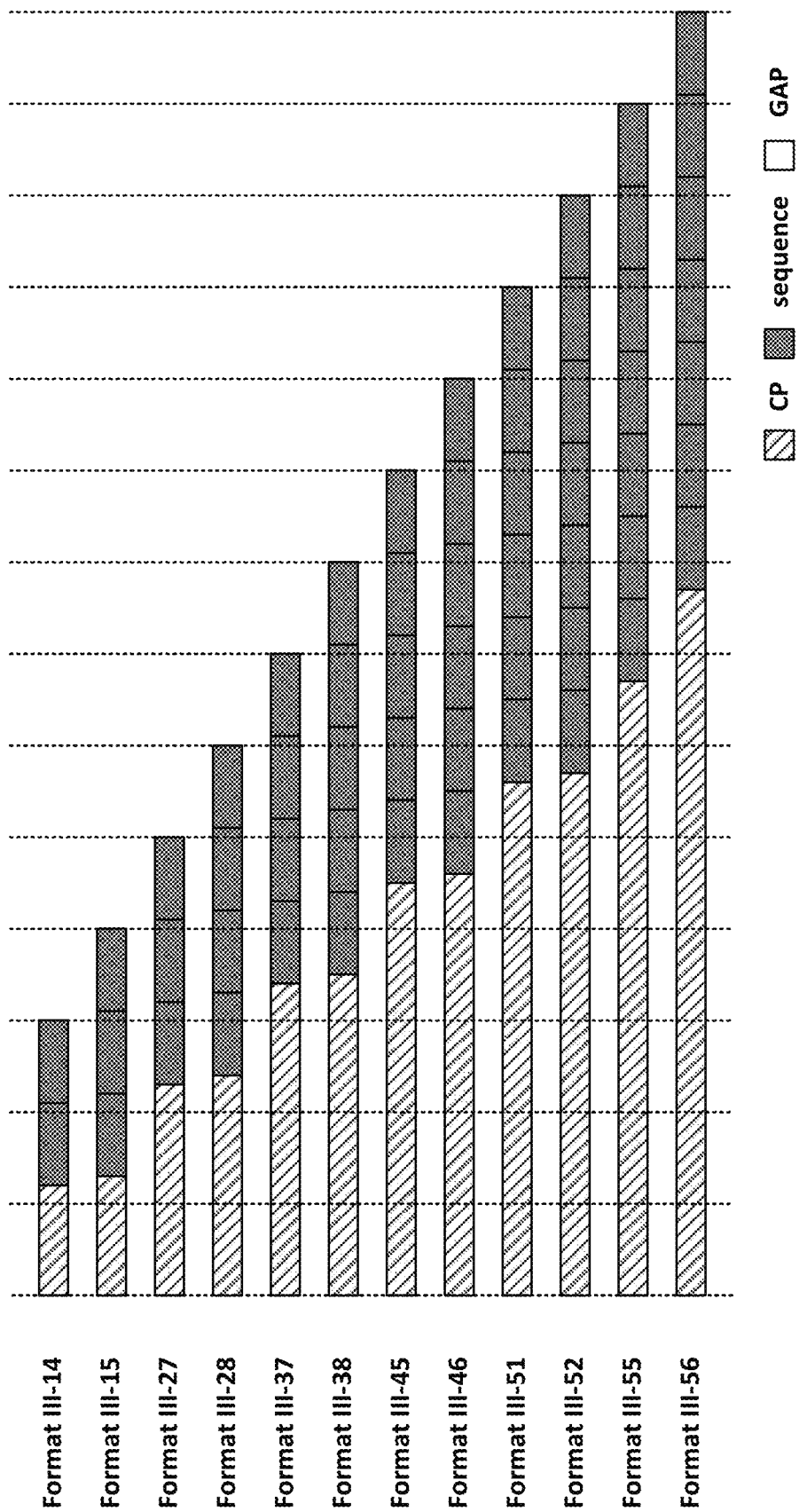
FIG. 16 illustrates additional exemplary PRACH formats according to various embodiments of this disclosure.

FIG. 16 illustrates PRACH preamble formats with no gap reserved according to various embodiments of this disclosure. These exemplary PRACH formats are also shown in TABLE 5. In this example, the ZC-sequence length (e.g. L_RA) can be one from the examples in TABLE 4, and the SCS (e.g. SCS_RA) can be scaled from 15 kHz such that SCS_RA=15/ρ, where ρ is the SCS scaling factor with respect to 15 kHz (e.g. p could be in the form of ρ=2^ν, where ν is an integer, positive, zero, or negative). Note that the N_CP and N_SEQ are scaling with ρ.

In another approach of this embodiment, a PRACH format with gap reserved after the sequence is supported.

Figure 17:
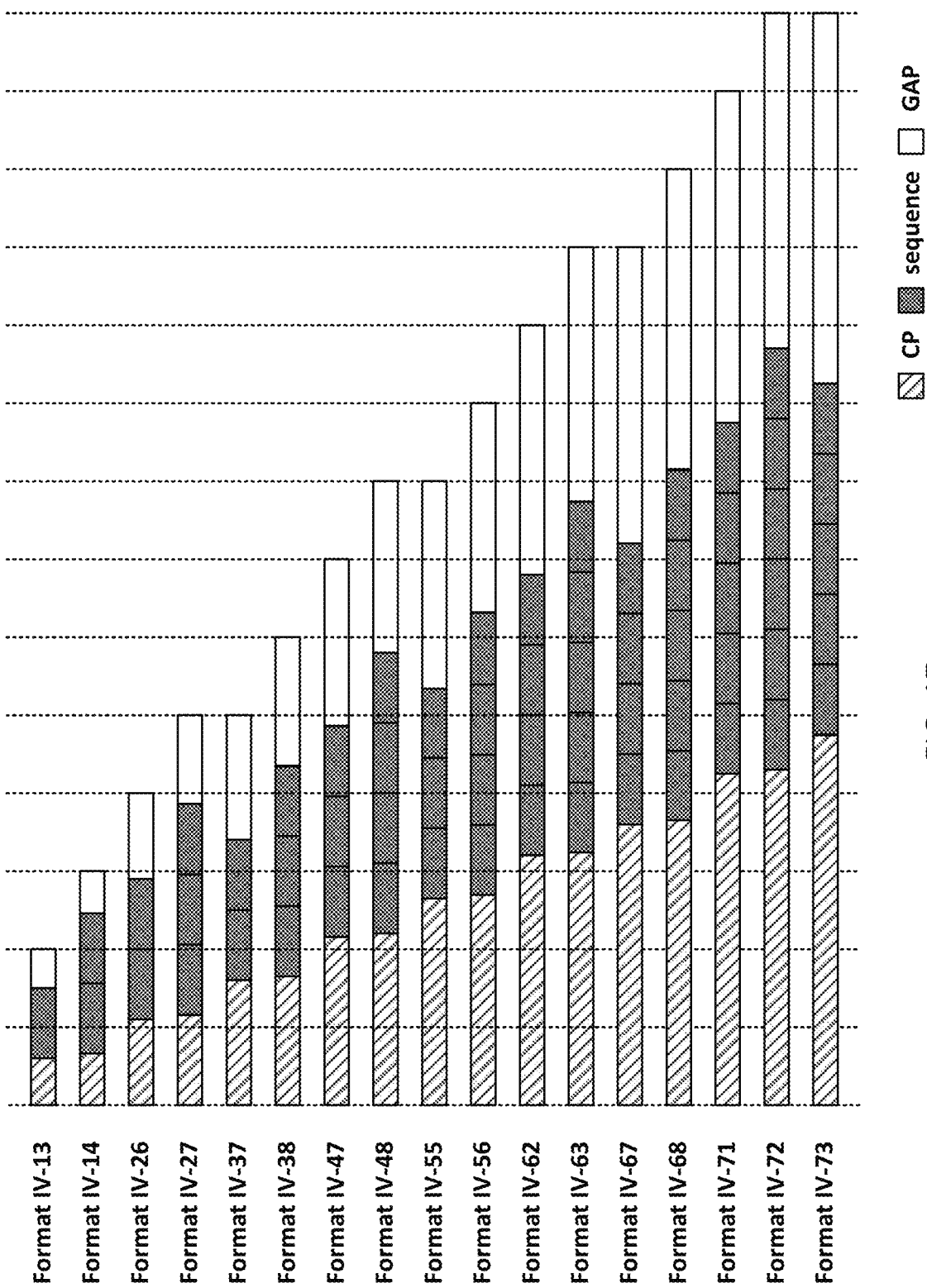
FIG. 17 illustrates additional exemplary PRACH formats according to various embodiments of this disclosure.

FIG. 17 illustrates additional PRACH formats with a gap according to various embodiments of this disclosure. The PRACH formats are also shown in TABLE 6.

In this example, the ZC-sequence length (e.g. L_RA) can be one from the examples in TABLE 4 and the SCS (e.g. SCS_RA) can be scaled from 15 kHz such that SCS_RA=15/ρ, where ρ is the SCS scaling factor with respect to 15 kHz (e.g. p could be in the form of ρ=2^ν, where ν is an integer, positive, zero, or negative). Note that the N_CP and N_SEQ are scaling with ρ.

TABLE 5

Example PRACH preamble formats.

| Format | L_RA | SCS_RA (kHz) | N_CP (κ) | N_SEQ (κ) | N_GAP (κ) | N_total (symbols) |
|---|---|---|---|---|---|---|
| III-0 | ≥139 | 15/ρ | 144*ρ | 1*2048*ρ | 0 | 1 |
| III-1 | ≥139 | 15/ρ | 288*ρ | 2*2048*ρ | 0 | 2 |
| III-2 | ≥139 | 15/ρ | 432*ρ | 3*2048*ρ | 0 | 3 |
| III-3 | ≥139 | 15/ρ | 576*ρ | 4*2048*ρ | 0 | 4 |
| III-4 | ≥139 | 15/ρ | 720*ρ | 5*2048*ρ | 0 | 5 |
| III-5 | ≥139 | 15/ρ | 864*ρ | 6*2048*ρ | 0 | 6 |
| III-6 | ≥139 | 15/ρ | 1008*ρ | 7*2048*ρ | 0 | 7 |
| III-7 | ≥139 | 15/ρ | 1152*ρ | 8*2048*ρ | 0 | 8 |
| III-8 | ≥139 | 15/ρ | 1296*ρ | 9*2048*ρ | 0 | 9 |
| III-9 | ≥139 | 15/ρ | 1440*ρ | 10*2048*ρ | 0 | 10 |
| III-10 | ≥139 | 15/ρ | 1584*ρ | 11*2048*ρ | 0 | 11 |
| III-11 | ≥139 | 15/ρ | 1728*ρ | 12*2048*ρ | 0 | 12 |
| III-12 | ≥139 | 15/ρ | 1872*ρ | 13*2048*ρ | 0 | 13 |
| III-13 | ≥139 | 15/ρ | 2016*ρ | 14*2048*ρ | 0 | 14 |
| III-14 | ≥139 | 15/ρ | 2480*ρ | 2*2048*ρ | 0 | 3 |
| III-15 | ≥139 | 15/ρ | 2624*ρ | 3*2048*ρ | 0 | 4 |
| III-16 | ≥139 | 15/ρ | 2768*ρ | 4*2048*ρ | 0 | 5 |
| III-17 | ≥139 | 15/ρ | 2912*ρ | 5*2048*ρ | 0 | 6 |
| III-18 | ≥139 | 15/ρ | 3056*ρ | 6*2048*ρ | 0 | 7 |
| III-19 | ≥139 | 15/ρ | 3200*ρ | 7*2048*ρ | 0 | 8 |
| III-20 | ≥139 | 15/ρ | 3344*ρ | 8*2048*ρ | 0 | 9 |
| III-21 | ≥139 | 15/ρ | 3488*ρ | 9*2048*ρ | 0 | 10 |
| III-22 | ≥139 | 15/ρ | 3632*ρ | 10*2048*ρ | 0 | 11 |
| III-23 | ≥139 | 15/ρ | 3776*ρ | 11*2048*ρ | 0 | 12 |
| III-24 | ≥139 | 15/ρ | 3920*ρ | 12*2048*ρ | 0 | 13 |
| III-25 | ≥139 | 15/ρ | 4064*ρ | 13*2048*ρ | 0 | 14 |
| III-26 | ≥139 | 15/ρ | 4816*ρ | 3*2048*ρ | 0 | 5 |
| III-27 | ≥139 | 15/ρ | 4960*ρ | 4*2048*ρ | 0 | 6 |
| III-28 | ≥139 | 15/ρ | 5104*ρ | 5*2048*ρ | 0 | 7 |
| III-29 | ≥139 | 15/ρ | 5248*ρ | 6*2048*ρ | 0 | 8 |
| III-30 | ≥139 | 15/ρ | 5392*ρ | 7*2048*ρ | 0 | 9 |
| III-31 | ≥139 | 15/ρ | 5536*ρ | 8*2048*ρ | 0 | 10 |
| III-32 | ≥139 | 15/ρ | 5680*ρ | 9*2048*ρ | 0 | 11 |
| III-33 | ≥139 | 15/ρ | 5824*ρ | 10*2048*ρ | 0 | 12 |
| III-34 | ≥139 | 15/ρ | 5968*ρ | 11*2048*ρ | 0 | 13 |
| III-35 | ≥139 | 15/ρ | 6112*ρ | 12*2048*ρ | 0 | 14 |
| III-36 | ≥139 | 15/ρ | 7152*ρ | 4*2048*ρ | 0 | 7 |
| III-37 | ≥139 | 15/ρ | 7296*ρ | 5*2048*ρ | 0 | 8 |
| III-38 | ≥139 | 15/ρ | 7440*ρ | 6*2048*ρ | 0 | 9 |
| III-39 | ≥139 | 15/ρ | 7584*ρ | 7*2048*ρ | 0 | 10 |
| III-40 | ≥139 | 15/ρ | 7728*ρ | 8*2048*ρ | 0 | 11 |
| III-41 | ≥139 | 15/ρ | 7872*ρ | 9*2048*ρ | 0 | 12 |
| III-42 | ≥139 | 15/ρ | 8016*ρ | 10*2048*ρ | 0 | 13 |
| III-43 | ≥139 | 15/ρ | 8160*ρ | 11*2048*ρ | 0 | 14 |
| III-44 | ≥139 | 15/ρ | 9488*ρ | 5*2048*ρ | 0 | 9 |
| III-45 | ≥139 | 15/ρ | 9632*ρ | 6*2048*ρ | 0 | 10 |
| III-46 | ≥139 | 15/ρ | 9776*ρ | 7*2048*ρ | 0 | 11 |
| III-47 | ≥139 | 15/ρ | 9920*ρ | 8*2048*ρ | 0 | 12 |
| III-48 | ≥139 | 15/ρ | 10064*ρ | 9*2048*ρ | 0 | 13 |
| III-49 | ≥139 | 15/ρ | 10208*ρ | 10*2048*ρ | 0 | 14 |
| III-50 | ≥139 | 15/ρ | 11824*ρ | 6*2048*ρ | 0 | 11 |
| III-51 | ≥139 | 15/ρ | 11968*ρ | 7*2048*ρ | 0 | 12 |
| III-52 | ≥139 | 15/ρ | 12112*ρ | 8*2048*ρ | 0 | 13 |
| III-53 | ≥139 | 15/ρ | 12256*ρ | 9*2048*ρ | 0 | 14 |
| III-54 | ≥139 | 15/ρ | 14160*ρ | 7*2048*ρ | 0 | 13 |
| III-55 | ≥139 | 15/ρ | 14304*ρ | 8*2048*ρ | 0 | 14 |

TABLE 6

Example PRACH preamble formats.

| Format | L_RA | SCS_RA (kHz) | N_CP (κ) | N_SEQ (κ) | N_GAP (κ) | N_total (symbols) |
|---|---|---|---|---|---|---|
| III-0 | ≥139 | 15/ρ | 216*ρ | 2*2048*ρ | 72*ρ | 2 |
| III-1 | ≥139 | 15/ρ | 288*ρ | 3*2048*ρ | 144*ρ | 3 |
| III-2 | ≥139 | 15/ρ | 360*ρ | 4*2048*ρ | 216*ρ | 4 |
| III-3 | ≥139 | 15/ρ | 432*ρ | 5*2048*ρ | 288*ρ | 5 |
| III-4 | ≥139 | 15/ρ | 504*ρ | 6*2048*ρ | 360*ρ | 6 |
| III-5 | ≥139 | 15/ρ | 576*ρ | 7*2048*ρ | 432*ρ | 7 |
| III-6 | ≥139 | 15/ρ | 648*ρ | 8*2048*ρ | 504*ρ | 8 |
| III-7 | ≥139 | 15/ρ | 720*ρ | 9*2048*ρ | 576*ρ | 9 |
| III-8 | ≥139 | 15/ρ | 792*ρ | 10*2048*ρ | 648*ρ | 10 |
| III-9 | ≥139 | 15/ρ | 864*ρ | 11*2048*ρ | 720*ρ | 11 |
| III-10 | ≥139 | 15/ρ | 936*ρ | 12*2048*ρ | 792*ρ | 12 |
| III-11 | ≥139 | 15/ρ | 1008*ρ | 13*2048*ρ | 864*ρ | 13 |
| III-12 | ≥139 | 15/ρ | 1080*ρ | 14*2048*ρ | 936*ρ | 14 |
| III-13 | ≥139 | 15/ρ | 1240*ρ | 1*2048*ρ | 1096*ρ | 2 |
| III-14 | ≥139 | 15/ρ | 1312*ρ | 2*2048*ρ | 1168*ρ | 3 |
| III-15 | ≥139 | 15/ρ | 1384*ρ | 3*2048*ρ | 1240*ρ | 4 |
| III-16 | ≥139 | 15/ρ | 1456*ρ | 4*2048*ρ | 1312*ρ | 5 |
| III-17 | ≥139 | 15/ρ | 1528*ρ | 5*2048*ρ | 1384*ρ | 6 |
| III-18 | ≥139 | 15/ρ | 1600*ρ | 6*2048*ρ | 1456*ρ | 7 |
| III-19 | ≥139 | 15/ρ | 1672*ρ | 7*2048*ρ | 1528*ρ | 8 |
| III-20 | ≥139 | 15/ρ | 1744*ρ | 8*2048*ρ | 1600*ρ | 9 |
| III-21 | ≥139 | 15/ρ | 1816*ρ | 9*2048*ρ | 1672*ρ | 10 |
| III-22 | ≥139 | 15/ρ | 1888*ρ | 10*2048*ρ | 1744*ρ | 11 |
| III-23 | ≥139 | 15/ρ | 1960*ρ | 11*2048*ρ | 1816*ρ | 12 |
| III-24 | ≥139 | 15/ρ | 2032*ρ | 12*2048*ρ | 1888*ρ | 13 |
| III-25 | ≥139 | 15/ρ | 2104*ρ | 13*2048*ρ | 1960*ρ | 14 |
| III-26 | ≥139 | 15/ρ | 2408*ρ | 2*2048*ρ | 2264*ρ | 4 |
| III-27 | ≥139 | 15/ρ | 2480*ρ | 3*2048*ρ | 2336*ρ | 5 |
| III-28 | ≥139 | 15/ρ | 2552*ρ | 4*2048*ρ | 2408*ρ | 6 |
| III-29 | ≥139 | 15/ρ | 2624*ρ | 5*2048*ρ | 2480*ρ | 7 |
| III-30 | ≥139 | 15/ρ | 2696*ρ | 6*2048*ρ | 2552*ρ | 8 |
| III-31 | ≥139 | 15/ρ | 2768*ρ | 7*2048*ρ | 2624*ρ | 9 |
| III-32 | ≥139 | 15/ρ | 2840*ρ | 8*2048*ρ | 2696*ρ | 10 |
| III-33 | ≥139 | 15/ρ | 2912*ρ | 9*2048*ρ | 2768*ρ | 11 |
| III-34 | ≥139 | 15/ρ | 2984*ρ | 10*2048*ρ | 2840*ρ | 12 |
| III-35 | ≥139 | 15/ρ | 3056*ρ | 11*2048*ρ | 2912*ρ | 13 |
| III-36 | ≥139 | 15/ρ | 3128*ρ | 12*2048*ρ | 2984*ρ | 14 |
| III-37 | ≥139 | 15/ρ | 3504*ρ | 2*2048*ρ | 3360*ρ | 5 |
| III-38 | ≥139 | 15/ρ | 3576*ρ | 3*2048*ρ | 3432*ρ | 6 |
| III-39 | ≥139 | 15/ρ | 3648*ρ | 4*2048*ρ | 3504*ρ | 7 |
| III-40 | ≥139 | 15/ρ | 3720*ρ | 5*2048*ρ | 3576*ρ | 8 |
| III-41 | ≥139 | 15/ρ | 3792*ρ | 6*2048*ρ | 3648*ρ | 9 |
| III-42 | ≥139 | 15/ρ | 3864*ρ | 7*2048*ρ | 3720*ρ | 10 |
| III-43 | ≥139 | 15/ρ | 3936*ρ | 8*2048*ρ | 3792*ρ | 11 |
| III-44 | ≥139 | 15/ρ | 4008*ρ | 9*2048*ρ | 3864*ρ | 12 |
| III-45 | ≥139 | 15/ρ | 4080*ρ | 10*2048*ρ | 3936*ρ | 13 |
| III-46 | ≥139 | 15/ρ | 4152*ρ | 11*2048*ρ | 4008*ρ | 14 |
| III-47 | ≥139 | 15/ρ | 4672*ρ | 3*2048*ρ | 4528*ρ | 7 |
| III-48 | ≥139 | 15/ρ | 4744*ρ | 4*2048*ρ | 4600*ρ | 8 |
| III-49 | ≥139 | 15/ρ | 4816*ρ | 5*2048*ρ | 4672*ρ | 9 |
| III-50 | ≥139 | 15/ρ | 4888*ρ | 6*2048*ρ | 4744*ρ | 10 |
| III-51 | ≥139 | 15/ρ | 4960*ρ | 7*2048*ρ | 4816*ρ | 11 |
| III-52 | ≥139 | 15/ρ | 5032*ρ | 8*2048*ρ | 4888*ρ | 12 |
| III-53 | ≥139 | 15/ρ | 5104*ρ | 9*2048*ρ | 4960*ρ | 13 |
| III-54 | ≥139 | 15/ρ | 5176*ρ | 10*2048*ρ | 5032*ρ | 14 |
| III-55 | ≥139 | 15/ρ | 5768*ρ | 3*2048*ρ | 5624*ρ | 8 |
| III-56 | ≥139 | 15/ρ | 5840*ρ | 4*2048*ρ | 5696*ρ | 9 |
| III-57 | ≥139 | 15/ρ | 5912*ρ | 5*2048*ρ | 5768*ρ | 10 |
| III-58 | ≥139 | 15/ρ | 5984*ρ | 6*2048*ρ | 5840*ρ | 11 |
| III-59 | ≥139 | 15/ρ | 6056*ρ | 7*2048*ρ | 5912*ρ | 12 |
| III-60 | ≥139 | 15/ρ | 6128*ρ | 8*2048*ρ | 5984*ρ | 13 |
| III-61 | ≥139 | 15/ρ | 6200*ρ | 9*2048*ρ | 6056*ρ | 14 |
| III-62 | ≥139 | 15/ρ | 6936*ρ | 4*2048*ρ | 6792*ρ | 10 |
| III-63 | ≥139 | 15/ρ | 7008*ρ | 5*2048*ρ | 6864*ρ | 11 |
| III-64 | ≥139 | 15/ρ | 7080*ρ | 6*2048*ρ | 6936*ρ | 12 |
| III-65 | ≥139 | 15/ρ | 7152*ρ | 7*2048*ρ | 7008*ρ | 13 |
| III-66 | ≥139 | 15/ρ | 7224*ρ | 8*2048*ρ | 7080*ρ | 14 |
| III-67 | ≥139 | 15/ρ | 8032*ρ | 4*2048*ρ | 7888*ρ | 11 |
| III-68 | ≥139 | 15/ρ | 8104*ρ | 5*2048*ρ | 7960*ρ | 12 |
| III-69 | ≥139 | 15/ρ | 8176*ρ | 6*2048*ρ | 8032*ρ | 13 |
| III-70 | ≥139 | 15/ρ | 8248*ρ | 7*2048*ρ | 8104*ρ | 14 |
| III-71 | ≥139 | 15/ρ | 9200*ρ | 5*2048*ρ | 9056*ρ | 13 |
| III-72 | ≥139 | 15/ρ | 9272*ρ | 6*2048*ρ | 9128*ρ | 14 |
| III-73 | ≥139 | 15/ρ | 10296*ρ | 5*2048*ρ | 10152*ρ | 14 |

As previously mentioned, for NTN, a large propagation delay typically exists between transmitter and receiver, and the particular max round trip delay (RTD) depends on the implementation scenarios. TABLE 7 shows example max RTD for some typical NTN scenarios.

TABLE 7

Example max round trip delays for NTN scenarios.

| Satellite type | GEO | LEO | LEO | LEO | LEO |
|---|---|---|---|---|---|
| Altitude | 35786 km | 600 km | 1200 km | 600 km | 1200 km |
| Min elevation angle | 10° | 10° | 10° | 10° | 10° |
| Max distance | 40586 km | 1932 km | 3131 km | 1932 km | 3131 km |
| Payload type | transparent | transparent | transparent | regenerative | regenerative |
| Max round trip delay | 541.46 ms | 25.77 ms | 41.77 ms | 12.89 ms | 20.89 ms |

Disabling HARQ feedback can be beneficial for some NTN scenarios. Therefore, additional aspects of this disclosure include a method for HARQ feedback disabling, over-riding rule for HARQ feedback disabling, HARQ enhancement with UE assistant information, DCI format after HARQ feedback disabled, and reliability recovery after HARQ feedback disabled.

In one embodiment, HARQ feedback can be configured to be disabled by a gNB. Various methods of this embodiment are discussed below.

Method 1. HARQ feedback can be configured to be disabled by a higher layer parameter (e.g. RRC parameter). A UE assumes HARQ feedback maintains disabled for all the transmissions until the higher layer parameter indicates HARQ feedback is enabled. At least one approach or combination of approaches for this method can be supported.

In a first approach of Method 1, the higher layer parameter to disable HARQ feedback could be cell-specific. For example, at least one field in ServingCellConfigCommon is used to indicate whether HARQ feedback is disabled or not. For another example, at least one field in ServingCellConfig is used to indicate whether HARQ feedback is disabled or not.

In a second approach of Method 1, the higher layer parameter to disable HARQ feedback could be cell-group-specific. For example, at least one field in CellGroupConfig is used to indicate whether HARQ feedback is disabled or not.

In a third approach of Method 1, the higher layer parameter to disable HARQ feedback could be UE-specific. For example, at least one field in ServingCellConfig is used to indicate whether a HARQ feedback is disabled or not.

In a fourth approach of Method 1, at least one higher layer parameter is used to configure whether DL HARQ feedback is disabled or not.

In a fifth approach of this method, at least one higher layer parameter is used to configure whether UL HARQ feedback is disabled or not.

In a sixth approach of Method 1, at least one higher layer parameter is used to configure whether DL and UL HARQ feedback is jointly disabled or not Method 2. HARQ feedback can be configured to be disabled by a DCI format. At least one approach or combination of approaches for this method can be supported.

In a first approach of Method 2, the DCI format can be a DCI format scheduling of PUSCH of a cell (e.g. DCI format 0_0 and/or DCI format 0_1). A UE assumes transmission of PUSCH(s) scheduled by the DCI format are with HARQ feedback disabled.

In a second approach of Method 2, the DCI format can be a DCI format scheduling of PDSCH of a cell (e.g. DCI format 1_0 and/or DCI format 1_1). A UE assumes transmission of PDSCH(s) scheduled by the DCI format are with HARQ feedback disabled.

In a third approach of Method 2, the DCI format can be a DCI format notifying a group of UEs information (e.g. DCI format 2_0 and/or DCI format 2_1). A UE assumes the transmission(s) are with HARQ feedback disabled for the same duration as the duration when the notified information was valid.

In a fourth approach of Method 2, a new separate field in the DCI format can be utilized to indicate a HARQ feedback is disabled or not. In a non-limiting embodiment, the field is 1-bit bitwidth.

In a fifth approach of Method 2, a value (e.g. a reserved value) of an existing field in the DCI format can be utilized to indicate a HARQ feedback is disabled (e.g. by setting the field to a non-numerical value). For one example, a value (e.g. a reserved value) of an existing field of HARQ processor number in the DCI format can be utilized to indicate the HARQ feedback is disabled (e.g. by setting the field to a non-numerical value). For another example, a value (e.g. a reserved value) of an existing field of downlink assignment index in the DCI format can be utilized to indicate a HARQ feedback is disabled (e.g. by setting the field to a non-numerical value). For yet another example, a value (e.g. a reserved value) of an existing field of PUCCH resource indicator in the DCI format can be utilized to indicate a HARQ feedback is disabled (e.g. by setting the field to a non-numerical value). For yet another example, a value (e.g. a reserved value) of an existing field of PDSCH-to-HARQ_feedback timing indicator in the DCI format can be utilized to indicate a HARQ feedback is disabled (e.g. by setting the field to a non-numerical value). For yet another example, a value (e.g. a reserved value) of an existing field of TPC command for scheduled PUCCH in the DCI format can be utilized to indicate a HARQ feedback is disabled (e.g. by setting the field to a non-numerical value). For yet another example, a value (e.g. a reserved value) of an existing field of TPC command for scheduled PUSCH in the DCI format can be utilized to indicate a HARQ feedback is disabled (e.g. by setting the field to a non-numerical value).

Method 3. HARQ feedback can be configured to be disabled by system information. In a first approach of Method 3, the indication of HARQ feedback being disabled or not can be in the content of PBCH. In a second approach of Method 3, the indication of HARQ feedback being disabled or not can be in RMSI. In a third approach of Method 3, the indication of HARQ feedback being disabled or not can be in OSI. In a fourth approach of Method 3, the indication of HARQ feedback being disabled or not can be in paging.

In one embodiment, there can be at least one method and/or approach supported to disable HARQ feedback as previously discussed, and an overriding rule of the indication by the at least one method and/or approach can be specified from a perspective of a UE.

In one approach, if a method of using a higher layer parameter for indicating whether a HARQ feedback is enabled or not, and a method of using system information for indicating whether a HARQ feedback is enabled or not, are both supported, a UE assumes the indication by the higher layer parameter overrides the indication by the system information, for the duration that the higher layer parameter is valid.

In another approach, if a method of using a higher layer parameter for indicating whether a HARQ feedback is enabled or not, and a method of using DCI format for indicating whether a HARQ feedback is enabled or not, are both supported, a UE assumes the indication by the DCI format overrides the indication by the higher layer parameter, for the transmission of the PUSCH or PDSCH scheduled by the DCI format.

In yet another approach, if a method of using system information for indicating whether a HARQ feedback is enabled or not, and a method of using DCI format for indicating whether a HARQ feedback is enabled or not, are both supported, a UE assumes the indication by the DCI format overrides the indication by the system information, for the transmission of the PUSCH or PDSCH scheduled by the DCI format.

In one embodiment, a UE could inform a gNB assistance information related to HARQ operation. In one approach, a UE could inform a gNB assistance information related to HARQ feedback disabling through a higher layer parameter. In one aspect, the assistance information related to HARQ disabling can be included in the RRC parameter UEAssistanceInformation. In another aspect, the assistance information related to HARQ operation can include the soft buffer information for reception of transmissions.

In yet another aspect, the assistance information related to HARQ operation can include the request for HARQ feedback disabling or enabling explicitly. In yet another aspect, the assistance information related to HARQ operation can include the request for disabling a set of HARQ feedbacks, and/or enabling a set of HARQ feedbacks (e.g. by indicating the index of HARQ feedback). In yet another aspect, the assistance information related to HARQ operation can include the request for increasing a number of HARQ feedback. In yet another aspect, the assistance information related to HARQ operation can include the request for decreasing a number of HARQ feedback.

In yet another aspect, a UE capable of providing the assistance information related to HARQ operation in RRC CONNECTED may initiate the procedure if at least one of the following: the UE was configured to do so, or upon detecting full utilization of the soft buffer, or upon detecting that it is no longer experiencing a full utilization of the soft buffer, or prefers to send a HARQ feedback disabling request, or prefers to send a HARQ feedback enabling request, or prefers to send a request for increasing the number of HARQ feedbacks, or prefers to send a request for decreasing the number of HARQ feedbacks, or prefers to send a request for disabling a set of HARQ feedbacks and/or enabling a set of HARQ feedbacks.

In yet another aspect, a UE shall set the contents of the UEAssistanceInformation message for the assistance information related to HARQ operation, if at least one of the following: upon detecting full utilization of the soft buffer, or upon detecting that it is no longer experiencing a full utilization of the soft buffer, or prefers to send a HARQ feedback disabling request, or prefers to send a HARQ feedback enabling request, or prefers to send a request for increasing the number of HARQ feedbacks, or prefers to send a request for decreasing the number of HARQ feedbacks, or prefers to send a request for disabling a set of HARQ feedbacks and/or enabling a set of HARQ feedbacks.

In yet another aspect, a UE assumes the DL HARQ feedback is disabled immediately after it informs gNB a full utilization of the soft buffer or HARQ feedback disabling request.

In another approach, a UE could inform a gNB assistance information related to HARQ operation through a HARQ ACK/NACK feedback.

In one aspect, the assistance information related to HARQ operation can include the soft buffer information for reception of transmissions.

In another aspect, the assistance information related to HARQ operation can include the request for HARQ feedback disabling or enabling explicitly.

In yet another aspect, there can be a new separate state, in addition to ACK and NACK, reported in the HARQ ACK/NACK feedback, indicating UE's request for HARQ operation.

In yet another aspect, there can be a HARQ codebook pattern indicating UE's request for HARQ operation. For example, an all-NACK codebook may be utilized by the UE to inform the gNB to disable HARQ feedback.

In one embodiment, at least one field(s) related to HARQ in a DCI format can be reserved or determined as 0 bitwidth after HARQ feedback disabled.

In one aspect, at least one field(s) related to HARQ in a DCI format can be reserved or determined as 0 bitwidth after HARQ feedback disabled, according to the DCI format.

In one approach, at least one field(s) related to DL HARQ in a DCI format can be reserved after DL HARQ feedback is disabled, if the DCI format is DCI format 1_0.

In one example, for DCI format 1_0 with CRC scrambled by C-RNTI (but not for random access procedure initialized by a PDCCH order) or CS-RNTI or MCS-C-RNTI, at least one of the following field(s) in the DCI format could be reserved after DL HARQ feedback is disabled: HARQ process number, downlink assignment index, TPC command for scheduled PUCCH, PUCCH resource indicator, or PDSCH-to-HARQ_feedback timing indicator.

In another example, for DCI format 1_0 with CRC scrambled by TC-RNTI, at least one of the following field(s) in the DCI format could be reserved after DL HARQ feedback is disabled: HARQ process number, TPC command for scheduled PUCCH, PUCCH resource indicator, or PDSCH-to-HARQ_feedback timing indicator. Note that for this example, downlink assignment index is reserved regardless DL HARQ is enabled or disabled.

In another approach, at least one field(s) related to DL HARQ in a DCI format can be determined as 0 bitwidth after DL HARQ feedback is disabled, if the DCI format is DCI format 1_1.

In one example, for DCI format 1_1 with CRC scrambled by C-RNTI or CS-RNTI or MCS-C-RNTI, at least one of the following field(s) in the DCI format could be determined as 0 bitwidth after DL HARQ feedback is disabled: HARQ process number, downlink assignment index, TPC command for scheduled PUCCH, PUCCH resource indicator, or PDSCH-to-HARQ_feedback timing indicator.

In yet another approach, at least one field(s) related to UL HARQ in a DCI format can be reserved after UL HARQ feedback is disabled, if the DCI format is DCI format 0_0.

In one example, for DCI format 0_0 with CRC scrambled by C-RNTI or CS-RNTI or MCS-C-RNTI, at least one of the following field(s) in the DCI format could be reserved after UL HARQ feedback is disabled: HARQ process number or TPC command for scheduled PUSCH.

In another example, for DCI format 0_0 with CRC scrambled by TC-RNTI, at least one of the following field(s) in the DCI format could be reserved after UL HARQ feedback is disabled: HARQ process number or TPC command for scheduled PUSCH.

In yet another approach, at least one field(s) related to UL HARQ in a DCI format can be determined as 0 bitwidth after UL HARQ feedback is disabled, if the DCI format is DCI format 0_1.

In one example, for DCI format 0_1 with CRC scrambled by C-RNTI or CS-RNTI or SP-CSI-RNTI or MCS-C-RNTI, at least one of the following field(s) in the DCI format could be determined as 0 bitwidth after UL HARQ feedback is disabled: HARQ process number, or $1^{st}$ downlink assignment index, or $2^{nd}$ downlink assignment index, or TPC command for scheduled PUSCH.

In another aspect, when at least one field(s) related to HARQ in a DCI format can be reserved, in addition, the reserved field(s) can be set as a default value (e.g. all-zero value).

In one embodiment, there can be enhancement to the transmission for reliability recovery after HARQ feedback is disabled. In one approach for the enhancement to the transmission, one transmission can be repeated with the same RV in each transmission, and the parameters for the enhancement to the transmission include at least one of a number of repetitions, or an index of repetition.

In another approach for the enhancement to the transmission, one TB can be transmitted multiple times with the different RV in each transmission, and the parameters for the enhancement to the transmission include at least one of a number of transmissions, or a RV value for each transmission. In one example, the RV values for the enhancement to the transmission can only be one from 0 or 3.

In one approach, the enhancement to the transmission is assumed by the UE without explicit configuration when the UE knows HARQ feedback is disabled. For this approach, the parameters for the enhancement to the transmission can be fixed and known to the UE when the UE knows HARQ feedback is disabled.

In another approach, the enhancement to the transmission is configured by the gNB to a UE. In one aspect of this approach, the configuration of the enhancement to the transmission can be separately indicated from the configuration of HARQ feedback disabling/enabling, and the enhancement to the transmission is not necessarily associated with HARQ feedback disabling. For this approach, parameters for the enhancement to the transmission can be configured to the UE.

In yet another approach, the enhancement to the transmission is jointly configured with HARQ disabling/enabling. For example, parameters for the enhancement to the transmission can be jointly coded with HARQ feedback disabling indicator.

Figure 18:
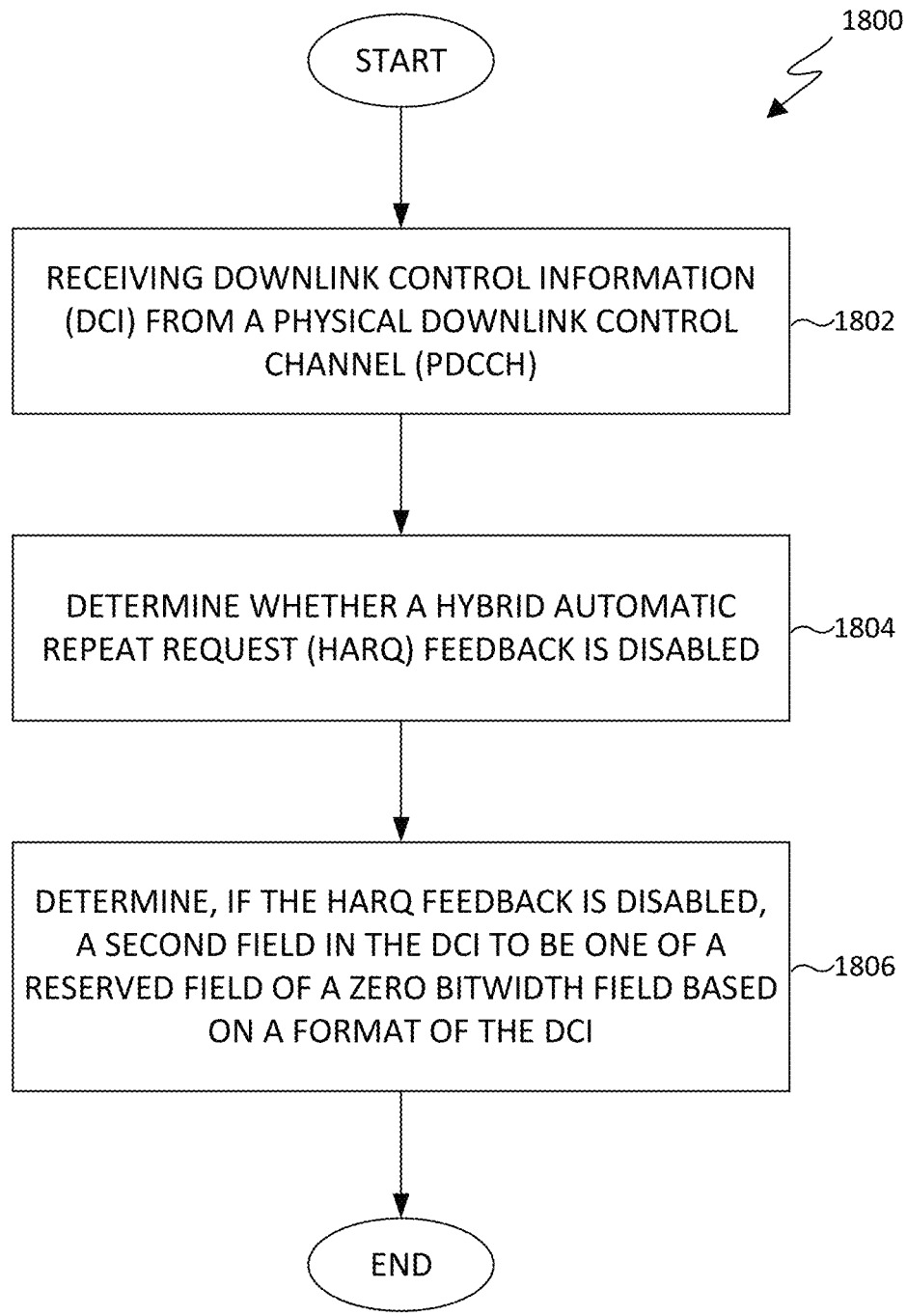
FIG. 18 illustrates a flowchart of a process for managing HARQ transmissions in a wireless network according to various embodiments of this disclosure.

FIG. 18 illustrates a flowchart of a process for managing HARQ transmissions in a wireless network according to various embodiments of this disclosure. Operations in flowchart 1800 can be implemented in a UE, such as UE 116 in FIG. 3.

Flowchart 1800 begins at operation 1802 by receiving, from a base station, downlink control information (DCI) in a physical downlink control channel (PDCCH).

In operation 1804, a determination is made as to whether a hybrid automatic repeat request (HARQ) feedback is disabled. The determination can be based on a first field in the DCI. In one embodiment, the first field can be a dedicated field for HARQ indication using reserved bits in the format of the DCI. In another embodiment, the first field can be an existing field in the format of the DCI that can be interpreted for disabling the HARQ feedback.

In operation 1806, a determination is made that a second field in the DCI to be one of a reserved field or a zero bitwidth field based on a format of the DCI if the HARQ feedback is disabled. In one embodiment, the second field can be determined to be the reserved field when the format of the DCI is DCI format 0_0 or DCI format 1_0. In another embodiment, the second field is determined to be the zero bitwidth field when the format of the DCI is DCI format 0_1 or DCI format 1_1.

In some embodiments, when the format of the DCI is DCI format 0_0 or DCI format 0_1, the second field can be a HARQ feedback number field or transmit power control (TPC) command field for scheduled physical uplink shared channel (PUSCH).

In other embodiments, when the format of the DCI is DCI format 1_0 or DCI format 1_1, the second field can be a HARQ feedback number field, a transmit power control (TPC) command field for scheduled physical uplink control channel (PUCCH), a PUCCH resource indicator field, or a PDSCH-to-HARQ feedback timing indicator field.

In some embodiments, flowchart 1800 can also include additional steps of generating a higher layer parameter that includes assistance information including at least one of soft buffer information for reception, a request for disabling the HARQ feedback, a request for enabling the HARQ feedback, a request for increasing a number of the HARQ feedback, or a request for decreasing the number of the HARQ feedback, and transmitting the higher layer parameter to the BS over an uplink channel.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined only by the claims.

What is claimed is:

1. A user equipment (UE) in a wireless communication system, the UE comprising:
   at least one transceiver configured to receive downlink control information (DCI) in a physical downlink control channel (PDCCH); and
   at least one processor operably connected to the at least one transceiver, the at least one processor configured to:
   determine, based on a first field in the DCI, whether a hybrid automatic repeat request (HARQ) feedback is disabled, and
   upon determination that the HARQ feedback is disabled, determine:
      that a second field in the DCI is a reserved field if a format of the DCI is a first format, and
      that the second field in the DCI is a zero bitwidth field if the format of the DCI is a second format.

2. The UE of claim 1, wherein the first field is one of a dedicated field for indication of disabling the HARQ feedback using reserved bits in the format of the DCI or an existing field in the format of the DCI, and wherein the existing field can be interpreted for disabling the HARQ feedback.

3. The UE of claim 1, wherein to determine the second field in the DCI, the at least one processor is configured to determine that the second field is the reserved field when the format of the DCI is one of a DCI format 0_0 or a DCI format 1_0.

4. The UE of claim 1, wherein to determine the second field in the DCI, the at least one processor is configured to determine that the second field is the zero bitwidth field when the format of the DCI is one of a DCI format 0_1 or a DCI format 1_1.

5. The UE of claim 1, wherein when the format of the DCI is one of a DCI format 0_0 or a DCI format 0_1, the second field is one of a HARQ feedback number field or transmit power control (TPC) command field for scheduled physical uplink shared channel (PUSCH).

6. The UE of claim 1, wherein when the format of the DCI is one of a DCI format 1_0 or DCI format 1_1, the second field is one of a HARQ feedback number field, a transmit power control (TPC) command field for scheduled physical uplink control channel (PUCCH), a PUCCH resource indicator field, or a PDSCH-to-HARQ feedback timing indicator field.

7. The UE of claim 1, wherein:
the at least one processor is further configured to generate a higher layer parameter that comprises assistance information related to HARQ operation, wherein the assistance information includes at least one of soft buffer information for reception, a request for disabling the HARQ feedback, a request for enabling the HARQ feedback, a request for increasing a number of the HARQ feedback, or a request for decreasing the number of the HARQ feedback, and
the at least one transceiver is further configured to transmit the higher layer parameter over an uplink channel.

8. A base station (BS) comprising:
a transceiver configured to transmit downlink control information (DCI) in a physical downlink control channel (PDCCH); and
a processor operably connected to the transceiver, the processor configured to:
determine whether a hybrid automatic repeat request (HARQ) feedback is disabled, and
generate the DCI with a first field indicating that the HARQ feedback is disabled,
wherein, for the HARQ feedback being disabled, the DCI includes a second field that is:
a reserved field if a format of the DCI is a first format, and
a zero bitwidth field if the format of the DCI is a second format.

9. The BS of claim 8, wherein the first field is one of a dedicated field for indication of disabling the HARQ feedback using reserved bits in the format of the DCI or an existing field in the format of the DCI, and wherein the existing field can be interpreted for disabling the HARQ feedback.

10. The BS of claim 8, wherein the second field is determined to be the reserved field when the format of the DCI is one of a DCI format 0_0 or a DCI format 1_0.

11. The BS of claim 8, wherein the second field is determined to be the zero bitwidth field when the format of the DCI is one of a DCI format 0_1 or a DCI format 1_1.

12. The BS of claim 8, wherein when the format of the DCI is one of a DCI format 0_0 or a DCI format 0_1, the second field is one of a HARQ feedback number field or transmit power control (TPC) command field for scheduled physical uplink shared channel (PUSCH).

13. The BS of claim 8, wherein when the format of the DCI is one of a DCI format 1_0 or DCI format 1_1, the second field is one of a HARQ feedback number field, a transmit power control (TPC) command field for scheduled physical uplink control channel (PUCCH), a PUCCH resource indicator field, or a PDSCH-to-HARQ feedback timing indicator field.

14. The BS of claim 8, wherein the transceiver is further configured to receive a higher layer parameter over an uplink channel, the higher layer parameter comprising assistance information related to HARQ operation, and wherein the assistance information includes at least one of soft buffer information for reception, a request for disabling the HARQ feedback, a request for enabling the HARQ feedback, a request for increasing a number of the HARQ feedback, or a request for decreasing the number of the HARQ feedback.

15. A method for managing hybrid automatic repeat request (HARQ) transmissions in a wireless communication system, the method comprising:
receiving downlink control information (DCI) in a physical downlink control channel (PDCCH);
determining, based on a first field in the DCI, whether a hybrid automatic repeat request (HARQ) feedback is disabled; and
upon determination that the HARQ feedback is disabled, determining
that a second field in the DCI is a reserved field if a format of the DCI is a first format, and
that the second field in the DCI is a zero bitwidth field if the format of the DCI is a second format.

16. The method of claim 15, wherein the first field is one of a dedicated field for indication of disabling the HARQ feedback using reserved bits in the format of the DCI or an existing field in the format of the DCI, and wherein the existing field can be interpreted for disabling the HARQ feedback.

17. The method of claim 15, wherein determining whether HARQ feedback is disabled comprises determining that the second field is the reserved field when the format of the DCI is one of a DCI format 0_0 or a DCI format 1_0, and that the second field is the zero bitwidth field when the format of the DCI is one of a DCI format 0_1 or a DCI format 1_1.

18. The method of claim 15, wherein when the format of the DCI is one of a DCI format 0_0 or a DCI format 0_1, the second field is one of a HARQ feedback number field or transmit power control (TPC) command field for scheduled physical uplink shared channel (PUSCH).

19. The method of claim 15, wherein when the format of the DCI is one of a DCI format 1_0 or DCI format 1_1, the second field is one of a HARQ feedback number field, a transmit power control (TPC) command field for scheduled physical uplink control channel (PUCCH), a PUCCH resource indicator field, or a PDSCH-to-HARQ feedback timing indicator field.

20. The method of claim 15, comprising:
generating a higher layer parameter that comprises assistance information related to HARQ operation, wherein the assistance information includes at least one of soft buffer information for reception, a request for disabling the HARQ feedback, a request for enabling the HARQ feedback, a request for increasing a number of the HARQ feedback, or a request for decreasing the number of the HARQ feedback; and transmitting the higher layer parameter over an uplink channel.

\* \* \* \* \*